US007353451B2

(12) United States Patent
Takahashi et al.

(10) Patent No.: US 7,353,451 B2
(45) Date of Patent: Apr. 1, 2008

(54) META DATA CREATION APPARATUS AND META DATA CREATION METHOD

(75) Inventors: Katsunao Takahashi, Tokyo (JP); Wataru Fujikawa, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 437 days.

(21) Appl. No.: 10/296,235

(22) PCT Filed: Apr. 9, 2002

(86) PCT No.: PCT/JP02/03511

§ 371 (c)(1),
(2), (4) Date: Dec. 4, 2002

(87) PCT Pub. No.: WO02/086760

PCT Pub. Date: Oct. 31, 2002

(65) Prior Publication Data

US 2003/0163480 A1 Aug. 28, 2003

(30) Foreign Application Priority Data

Apr. 19, 2001 (JP) ............................ 2001-121484

(51) Int. Cl.
*G06F 15/00* (2006.01)

(52) U.S. Cl. ...................................................... 715/512

(58) Field of Classification Search ................. 715/512
See application file for complete search history.

(56) References Cited

U.S. PATENT DOCUMENTS 5,537,618 A * 7/1996 Boulton et al. ............. 715/745
5,574,845 A * 11/1996 Benson et al. .............. 345/418
6,085,185 A * 7/2000 Matsuzawa et al. ........... 707/2
6,557,042 B1 * 4/2003 He et al. .................... 709/231
6,909,708 B1 * 6/2005 Krishnaswamy et al. ... 370/352
7,028,252 B1 * 4/2006 Baru et al. ............... 715/500.1

FOREIGN PATENT DOCUMENTS

JP 11-15844 1/1999
JP 11272716 10/1999

OTHER PUBLICATIONS

Hill et al., "Recommending and Evaluating Choices in a Virtual Community of Use", Proceedings of the SIGCHI Conference on Human Factors in Computing Systems, 1995, p. 1-12.*

Sumiya et al., "Dynamic Video Production and Delivery from Indexed Live Video Stream", Transactions of Information Processing Society of Japan Data Base, vol. 41, No. SIGI(TOD 5), Feb. 15, 2000, pp. 87-98.

English Language Abstract of JP 11-272716.

English Language Abstract of JP 11-15844.

Takahashi et al., On a Way to Retrieve Video Using Gamon Information (Video "Fingerprints"), Technical Report of IEICE IE98-83, vol. 98, No. 422, Nov. 20, 1998, pp. 1-8, together with an English language translation of p. 2, right column, lines 11-17 under sub-section 2.2.

(Continued)

*Primary Examiner*—William Bashore
*Assistant Examiner*—Amelia Rutledge
(74) *Attorney, Agent, or Firm*—Greenblum & Bernstein, P.L.C.

(57) ABSTRACT

The present invention is intended to detect, when a meta data author inputs a viewpoint and viewpoint score to contents having time information, time information of the contents corresponding to the input time of the viewpoint and viewpoint score input, assign corresponding time information to the viewpoint and viewpoint score input and create meta data related to the viewpoint and viewpoint score.

10 Claims, 25 Drawing Sheets

112

402a 402b

| VIEWPOINT A : | | VIEWPOINT B : | |
|---|---|---|---|
| SCORE | KEY | SCORE | KEY |
| 0.0 | 0 | 0.0 | A |
| 0.2 | 1 | 1.0 | S |
| 0.4 | 2 | | |
| 0.6 | 3 | | |
| 0.8 | 4 | | |
| 1.0 | 5 | | |

403a 401a 403b 401b

EXAMPLE OF USING 2 VIEWPOINTS, 10-KEY NUMERICAL PAD AND KEYBOARD

OTHER PUBLICATIONS

Babaguchi, "Organizing Video by Understanding Media", Technical Report of IEICE EI 99-18, vol. 99, No. 179, Jul. 15, 1999, pp. 39-46, together with an English language translation of p. 44, left column, lines 2-8 under sub-section 4.1.
"Video Retrieval Method by Query Using Action Phrases", IEICE Transactions D-II, vol. J80-D-II, No. 6, Jun. 1997, pp. 1590-1599, together with an English language translation of p. 1591, left column, lines 7-12.
Ishijima et al., "Life Media:Structuring and Summarization of Personal Experience Imaging", Technical Report of IEICE IE2000-23, vol. 100, No. 179, Jul. 13, 2000, pp. 51-58, together with an English language translation of p. 55, sub-section 4.1.

* cited by examiner

200 META DATA DESCRIPTION DTD

```
<?xml version ="1.0"encoding="utf- 8"?>
<!-- Meaning Markup Language DTD -->
<!ELEMENT MeaningDecription    (MeaningTime)*      >    201
<!ELEMENT MeaningTime>         (Meaning,Score)*    >    202
<!ATTLIST MeaningTime
      StartTime     CDATA   #REQUIRED                   203
      EndTime       CDATA   #REQUIRED                   204
>
<!ELEMENT Meaning          (#PCDATA)          >         205
<!ELEMENT Score            (#PCDATA)          >         206
```

FIG. 2

110 META DATA

```
<?xml version="1.0"encoding="utf- 8"?>
<!DOCTYPE MeaningDescription SYSTEM"Meaning.dtd">
<MeaningDescription>
 <MeaningTime StartTime="00:00:00"EndTime="00:10:00">
  <Meaning>A</Meaning>
  <Score>0.8</Score>
 </MeaningTime>
 <MeaningTime StartTime="00:10:00"EndTime="00:20:00">
  <Meaning>A</Meaning>
  <Score>0.2</Score>
  <Meaning>B</Meaning>
  <Score>1</Score>
 </MeaningTime>
</MeaningDescription>
```

| VIEWPOINT A : | |
|---|---|
| SCORE | KEY |
| 0.0 | 0 |
| 0.2 | 1 |
| 0.4 | 2 |
| 0.6 | 3 |
| 0.8 | 4 |
| 1.0 | 5 |

EXAMPLE OF USING 1 VIEWPOINT AND 10-KEY NUMERICAL PAD

| VIEWPOINT A : | | VIEWPOINT B : | |
|---|---|---|---|
| SCORE | KEY | SCORE | KEY |
| 0.0 | 0 | 0.0 | A |
| 0.2 | 1 | 1.0 | S |
| 0.4 | 2 | | |
| 0.6 | 3 | | |
| 0.8 | 4 | | |
| 1.0 | 5 | | |

402a 402b 403a 401a 403b 401b

EXAMPLE OF USING 2 VIEWPOINTS, 10-KEY NUMERICAL PAD AND KEYBOARD

FIG. 5

META DATA CREATION APPARATUS AND META DATA CREATION METHOD

TECHNICAL FIELD

The present invention relates to an apparatus and method for meta data creation for creating meta data of a viewpoint and viewpoint score in real time for contents having time information.

BACKGROUND ART

Conventionally, there is a practice of creating index information by extracting information on features of multimedia contents. For extracting information on features of multimedia contents, manual and automatic methods are available.

There are two methods as the automatic method. One is a method of extracting feature information through a feature information extraction algorithm without depending on the meaning of content and quality of multimedia contents. The other is a method using a recognition technology specialized for respective media, recognizing meanings of the multimedia contents and carrying out structuring.

The former is described, for example, in "On a way to Retrieve Video using Gamon Information" (TECHNICAL REPORT OF IEICE IE98-83). This method uses average color information of each frame composing a moving image as feature information of the moving image. There is also a long-established method of using a histogram of each frame as feature information.

The latter is described, for example, in "Organizing Video by Understanding Media" (TECHNICAL REPORT OF IEICE IE99-18). This method is intended to structure the content of a moving image by combining scenario information, voice information, image information, telop, CC (Closed Caption) information using a combination coordinated technique.

Furthermore, IEICE Transactions D-II Vol. J80-D-II No.6 pp1590 to 1599 (1997) reports on a technology for searching for an arbitrary moving image scene using human words. This method associates a positional relationship between objects, movements and changes with human words beforehand. Then, this method semi-automatically extracts objects in a moving image whose positional relationship or movement has changed corresponding to these human words and thereby searches for an arbitrary moving image scene using human words.

Furthermore, "LIFE MEDIA: Structuring & summarization of personal experience imaging" (TECHNICAL REPORT OF IEICE IE2000-23) reports on a study of associating human sensibilities with moving images. This uses alpha wave and beta wave of human brain waveforms and associates changes in these brain waveforms with the meaning or content of the moving images.

On the other hand, International Organization for Standardization MPEG-7 intends to realize high-function search/abstraction using multimedia contents tagged with viewpoints and viewpoint scores. However, the scope of the MPEG-7 (Moving Picture Experts Group Phase-7) covers no method of creating viewpoint scores, and therefore the method of creating viewpoint scores constitutes a problem in implementation.

With regard to a viewpoint score creating method, a method of manually realizing off-line tagging is mainstream. This method extracts cut points (features) of an image first and then delimits the image at cut points and thereby delimits the image scene by scene. Then, the author determines time information for each cut point and a viewpoint and viewpoint score to be assigned for each scene. Finally, the author creates meta data in an XML (eXtensible Markup Language) format, which is information on multimedia contents, from the determined time information, viewpoint and viewpoint score using an editor. Furthermore, when describing meta data contents, the author manually enters characters using a keyboard. Then, when creating index information, the user of the meta data enters arbitrary viewpoints and viewpoint scores and thereby extracts information on the viewpoints and viewpoint scores input from the contents and creates index information.

However, the conventional viewpoint meta data creation method involves the following problems:

That is, the method of using an average color of each frame and a histogram as a feature method can extract feature information through simple calculations, but can associate the extraction of the feature information with only color information. Thus, scenario information and voice information, etc. are not reflected in the feature information.

On the other hand, the coordinated technique using a plurality of pieces of information such as scenario information and image information contributes to improvement of accuracy of a content analysis. However, while the feature information such as scenario information and image information can be easily detected by a human visual check, it is difficult to mechanically and automatically calculate and detect the feature information. Thus, that technique is concluded to have problems when it is put to practical use.

Furthermore, according to the method of semi-automatically extracting objects in a moving image whose positional relationship or movement has changed, not all human words correspond to changes in the positional relationship and movement between frames. Thus, it is difficult to automatically associate human words with multimedia contents using this method. Furthermore, a relationship between human words and multimedia contents varies from one multimedia content to another. Furthermore, this association is only applicable to specific moving images. Moreover, applications of a moving image in the above described document are limited to specific sports.

Furthermore, it will take considerable time to put to practical use the method of using human brain waveforms which associates feature information with human sensibilities because there are many unknown areas in the structure of a human brain itself.

Furthermore, using the method of automatically extracting this feature information to generate viewpoints and viewpoint scores involves such problems that there are restrictions on the type or the number of viewpoints and viewpoint scores depending on the content of the recognition technology and the accuracy of viewpoints and viewpoint scores depends on the performance of the recognition technology.

Furthermore, there is also a problem that viewpoints and viewpoint scores created may be different in quality from human sensibilities or may not always match human sensibilities. There is also a problem that extracting viewpoints and viewpoint scores often involves complicated apparatuses and processing and increases costs.

Furthermore, according to the technology whereby the meta data author manually creates viewpoints and viewpoint scores off line, an image reproduction apparatus does not operate in concert with contents writing or creation. For this reason, the author needs to record time information of multimedia contents at cut points and the correspondence between scene viewpoints and viewpoint scores successively. Furthermore, the author needs to rewrite this recorded time information, viewpoints and viewpoint scores into a final format. This involves a problem that the processing takes enormous time and costs.

DISCLOSURE OF INVENTION

It is an object of the present invention to provide an apparatus and method for creating meta data that allows a meta data author to enter a viewpoint and viewpoint score in real time while monitoring contents with time information and deciding their meaning and content, thus making it possible to automatically create meta data having a viewpoint to which contents time information is assigned.

When the meta data author enters a viewpoint and viewpoint score into contents having time information, the present invention detects the time information of the contents associated with the time at which the viewpoint and viewpoint score were entered, assigns this associated time information to the viewpoint and viewpoint score entered and creates meta data with regard to the viewpoint and viewpoint score.

This allows the meta data author to enter a viewpoint and viewpoint score that match the author's sensibilities while monitoring contents having time information and determining the meaning and content and thereby create meta data of the viewpoint and viewpoint score with the contents time information assigned in real time.

BRIEF DESCRIPTION OF DRAWINGS

FIG. 2 illustrates an example of meta data description DTD according to Embodiment 1;

FIG. 3 illustrates an example of the meta data description according to Embodiment 1;

FIG. 4 illustrates a configuration of a viewpoint score assignment table according to Embodiment 1;

FIG. 5 is another configuration of the viewpoint score assignment table according to Embodiment 1;

BEST MODE FOR CARRYING OUT THE INVENTION

With reference now to the assigned drawings, a meta data creation apparatus (viewpoint time meta data creation apparatus) according to embodiments of the present invention will be explained in detail below.

Embodiment 1

Figure 1:
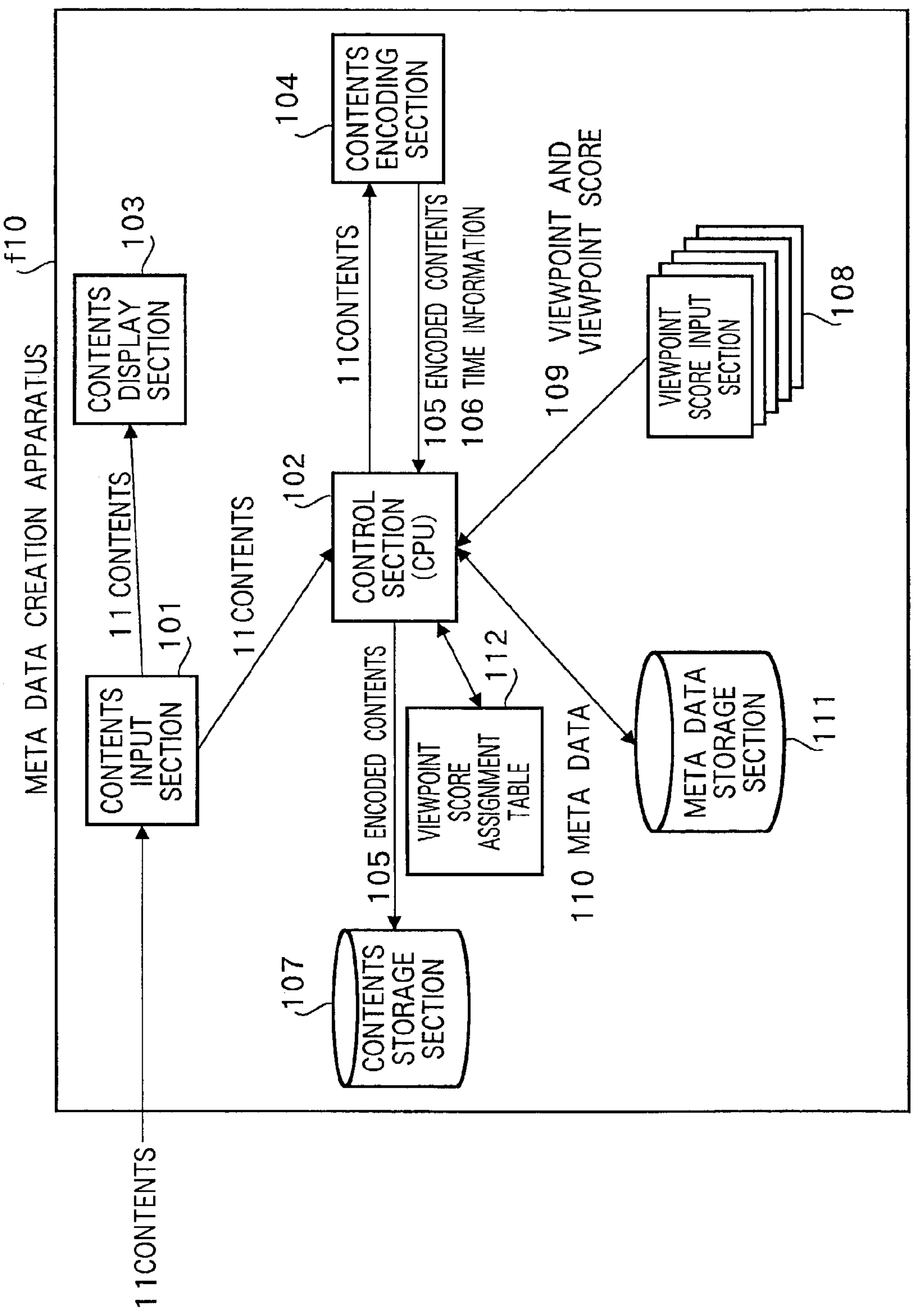
FIG. 1 is a block diagram showing a configuration of a meta data creation apparatus according to Embodiment 1 of the present invention.

Embodiment 1 of the present invention assumes that the author of meta data will enter a viewpoint and viewpoint score for this viewpoint into contents in real time while monitoring the contents in real time. The meta data creation apparatus according to Embodiment 1 of the present invention will be explained using the assigned drawings. A configuration of the meta data creation apparatus according to Embodiment 1 of the present invention will be explained using FIG. 1 first. FIG. 1 is a block diagram showing a configuration of the meta data creation apparatus according to Embodiment 1 of the present invention.

In FIG. 1, meta data creation apparatus f10 is fed contents 11 for which meta data will be created. Contents 11 are one or more media of moving images, voice or moving images/voice or text or stereoscopic images or animation.

Furthermore, meta data creation apparatus f10 is provided with contents input section 101, which is a section for inputting contents 11. According to Embodiment 1, contents input section 101 uses image inputting section such as a camera.

Furthermore, meta data creation apparatus f10 is provided with contents display section 103 that displays input contents 11. Contents display section 103 is an image display section such as a monitor.

Furthermore, meta data creation apparatus f10 is also provided with contents encoding section 104 that encodes contents 11 and generates encoded contents 105. Encoding formats available for contents encoding section 104 include MPEG (Moving Picture Experts Group)-1, MPEG-2, MPEG-4, MP-3 (MPEG-1 Layer 3), etc. Furthermore, contents encoding section 104 also creates contents time information 106. Time information 106 is local time information indicated by a relative time with respect to a reference time of contents.

Furthermore, meta data creation apparatus f10 is provided with contents storage section 107 for storing encoded contents 105 generated by contents encoding section 104.

Furthermore, meta data creation apparatus f10 is also provided with viewpoint score input section 108 for the author to enter a viewpoint and viewpoint score according to the content of contents 11. As viewpoint score input section 108, it is possible to use an input section available to the meta data creation apparatus, which can be a keyboard of a PC, numerical keys, arrow keys, mouse, remote controller keys, keys provided for electronic devices, keys provided for home appliances, keys provided for portable devices, panel keys, touch panel keys or section for inputting voice, etc. That is, any input section can be used which at least allows the author of meta data to input viewpoint scores while monitoring contents 11 displayed on contents display section 103 when the author wants to assign viewpoint scores.

Furthermore, as viewpoint score input section 108, it is also possible to use a plurality of these input sections so that a plurality of authors inputs viewpoints. In this case, since sensibilities differ from one author to another, different viewpoints and viewpoint scores 109 are input from the plurality of authors. This allows different viewpoints and viewpoint scores 109 to be given to certain contents. This makes it possible to provide the meta data user with services from the plurality of authors. Furthermore, when the meta data user uses viewpoints and viewpoint scores input by other people, it is also possible to create index information from the contents. For example, meta data created based on viewpoints and viewpoint scores given by a professional baseball commentator may be used by people in general. This allows additional values to be added to the contents.

Furthermore, viewpoints and viewpoint scores are viewpoints used for MPEG-7 or other international standards or industrial standards. When transformed into meta data, which will be described later, viewpoints and viewpoint scores will be described in DTD (Document Type Definition), RDF, XML Schema, etc. By the way, viewpoints may also be user-defined viewpoints. Furthermore, there can be a plurality of viewpoints and the above-described viewpoints may also be used combined with one another. This transforms viewpoints and viewpoint scores into a general format, which gives versatility to the viewpoints and viewpoint scores.

Furthermore, meta data creation apparatus f10 is provided with control section (CPU) 102 as a meta data creation section that associates time information 106 (time information within contents) with the time at which viewpoints and viewpoint scores were input by viewpoint score input section 108 and creates meta data 110 with time information 106 corresponding to the viewpoints and viewpoint scores 109 assigned. Control section 102 also controls entire meta data creation apparatus f10 in addition to the meta data creation section.

Furthermore, control section 102 creates meta data 110 based on a definition by DTD of XML shown in FIG. 2. FIG. 2 shows meta data description DTD according to Embodiment 1.

As indicated by reference numeral 201 in FIG. 2, meta data description DTD 200 defines MeaningTime which is one or more pieces of time information as an element. Furthermore, as indicated by reference numeral 202 in the figure, "Meaning" which is one or more viewpoints and "Score" which is a viewpoint score are defined as MeaningTime elements. Furthermore, as attributes of MeaningTime, "StartTime" which is a start time of a viewpoint as indicated by reference numeral 203 in the figure and "EndTime" which is an end time of the viewpoint as indicated by reference numeral 204 in the figure are defined as necessary elements. Moreover, "StartTime" and "EndTime" are defined as character data. Furthermore, as indicated by reference numerals 205 and 206 in the figure, "Meaning" and "Score" are defined as character data.

FIG. 3 shows an example of meta data actually created by control section 102. As indicated by reference numeral 301 in the figure, viewpoint A and viewpoint score 0.8 corresponding to viewpoint A are given between time 0 seconds (00:00:00) and time 10 seconds (00:10:00). Furthermore, as indicated by reference numeral 302 in the figure, viewpoint A and viewpoint score 0.2 corresponding to viewpoint A and viewpoint B and viewpoint score 1 corresponding to viewpoint B are given between time 10 seconds (00:10:00) and time 20 seconds (00:20:00).

Furthermore, meta data creation apparatus f10 is provided with meta data storage section 111 that stores viewpoint meta data 110 created by control section 102.

Furthermore, meta data creation apparatus f10 is also provided with viewpoint score assignment table 112 in which predetermined viewpoints and viewpoint scores are assigned to respective input keys of viewpoint score input section 108 as shown in FIG. 4. More specifically, viewpoint score assignment table 112 stores a plurality of pairs of viewpoint 402 and viewpoint score 403 with respect to key 401 of viewpoint score input section 108. FIG. 4 shows an example of score information corresponding to one viewpoint "A" and the score information assigned to 10 keys of viewpoint score input section 108. FIG. 4 shows a configuration of the viewpoint score assignment table according to Embodiment 1.

In this way, when, for example, the author depresses "4" of the ten-key pad, viewpoint "A" and viewpoint score "0.8" corresponding to viewpoint "A" are input. In this way, the author can input a desired viewpoint and viewpoint score by only depressing a predetermined key instead of directly entering the viewpoint and viewpoint score. Furthermore, the author can input a viewpoint and viewpoint score simultaneously through a single key input operation. As a result, the viewpoint and viewpoint score input operation by the author becomes by far easier, which drastically speeds up the viewpoint and viewpoint score input operation.

Furthermore, as shown in FIG. 5, a plurality of viewpoints may be assigned to information input by viewpoint score input section 108. FIG. 5 is a configuration diagram showing another example of the viewpoint score assignment table according to Embodiment 1.

According to viewpoint score assignment table 112 shown in FIG. 5, viewpoint "A" 402*a* and its viewpoint score 403*a* are assigned to ten-key 401*a* of viewpoint score input section 108 and viewpoint "B" 402*b* and its viewpoint score 403*b* are assigned to key 401*b* of the keyboard of viewpoint score input section 108.

With provision of viewpoint score assignment table 112 as shown in FIG. 5, even if there is a plurality of viewpoints, those viewpoints and viewpoint scores can be entered through a single key input. This drastically simplifies entries of viewpoints and viewpoint scores, which allows real-time entries of viewpoints and viewpoint scores into contents. By the way, three or more viewpoints may also be assigned to viewpoint score assignment table 112.

Figure 6:
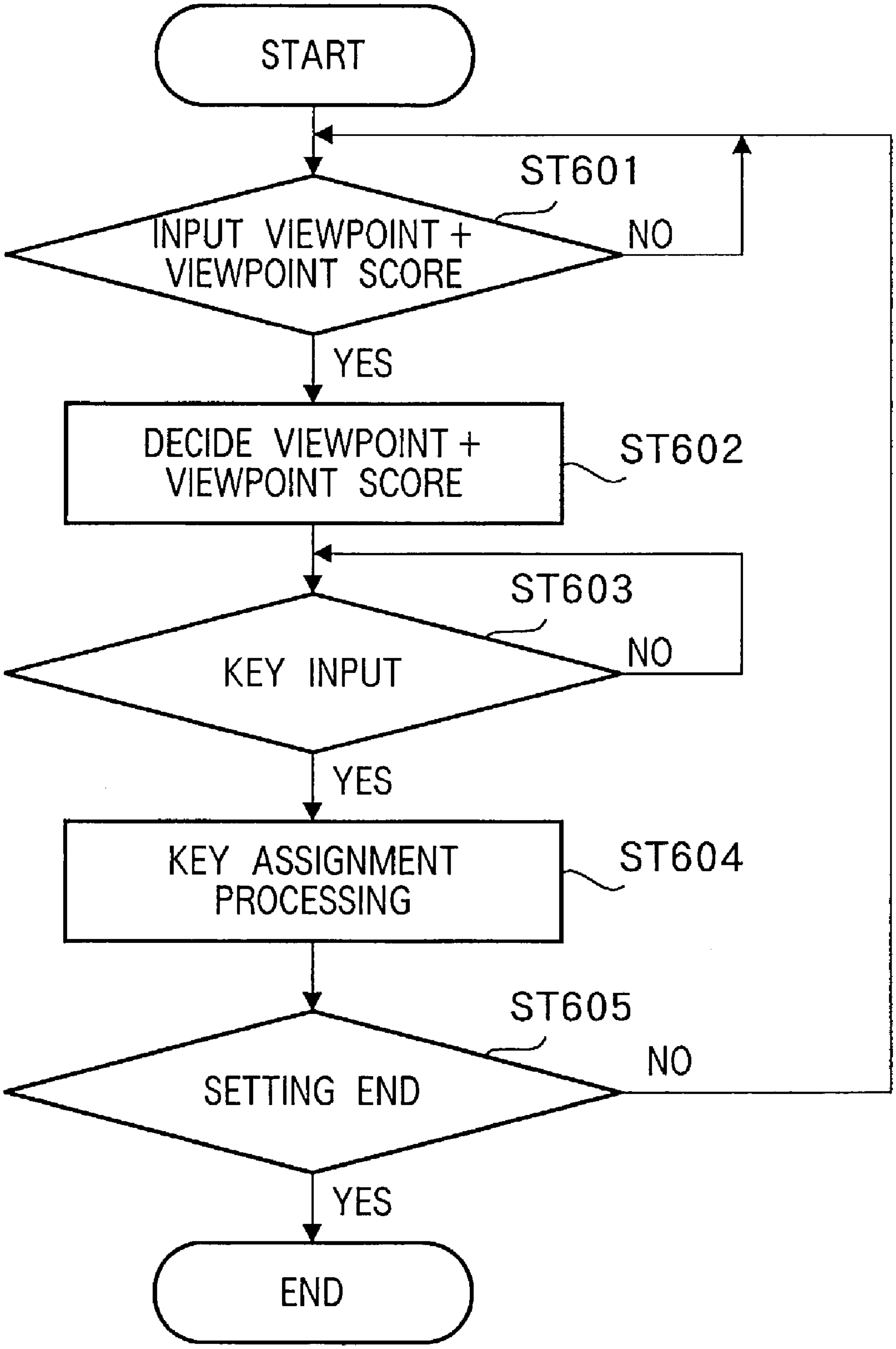
FIG. 6 is a flow chart showing a flow of setting the viewpoint score assignment table according to Embodiment 1.

Furthermore, Embodiment 1 allows the author to arbitrarily set viewpoint score assignment table 112. A process of setting the viewpoint score assignment table according to Embodiment 1 will be explained using FIG. 6. FIG. 6 is a flow chart showing a flow of setting the viewpoint score assignment table according to Embodiment 1.

When the author operates viewpoint score input section 108 thereby moving the process to a viewpoint score assignment table setting operation, control section 102 decides whether there are any entries of viewpoints and viewpoint scores (scores by viewpoint) from viewpoint score input section 108 (ST601). If there are some entries of viewpoints and viewpoint scores, control section 102 decides the entered viewpoints and viewpoint scores to be valid (ST602). Then, control section 102 decides whether any of the keys of viewpoint score input section 108 has been depressed or not (ST603). When it is decided that some key of viewpoint score input section 108 has been depressed, control section 102 assigns the viewpoints and viewpoint scores decided in ST602 to the depressed key (ST604). Then, when the settings of all viewpoints and scores by viewpoint are completed (ST605), the processing is finished.

Thus, setting viewpoints and scores by viewpoint for arbitrary keys makes it possible to set viewpoint score assignment table 112 required by the author. This embodiment allows viewpoint score assignment table 112 to be set freely, but it is also possible to adopt an embodiment that provides a viewpoint score assignment table by default.

Then, the viewpoint and viewpoint score input method according to Embodiment 1 will be explained using FIG. 7.

Embodiment 1 adopts a viewpoint and viewpoint score indicated by a depressed key after the key is depressed until the next key is depressed.

Figure 7:
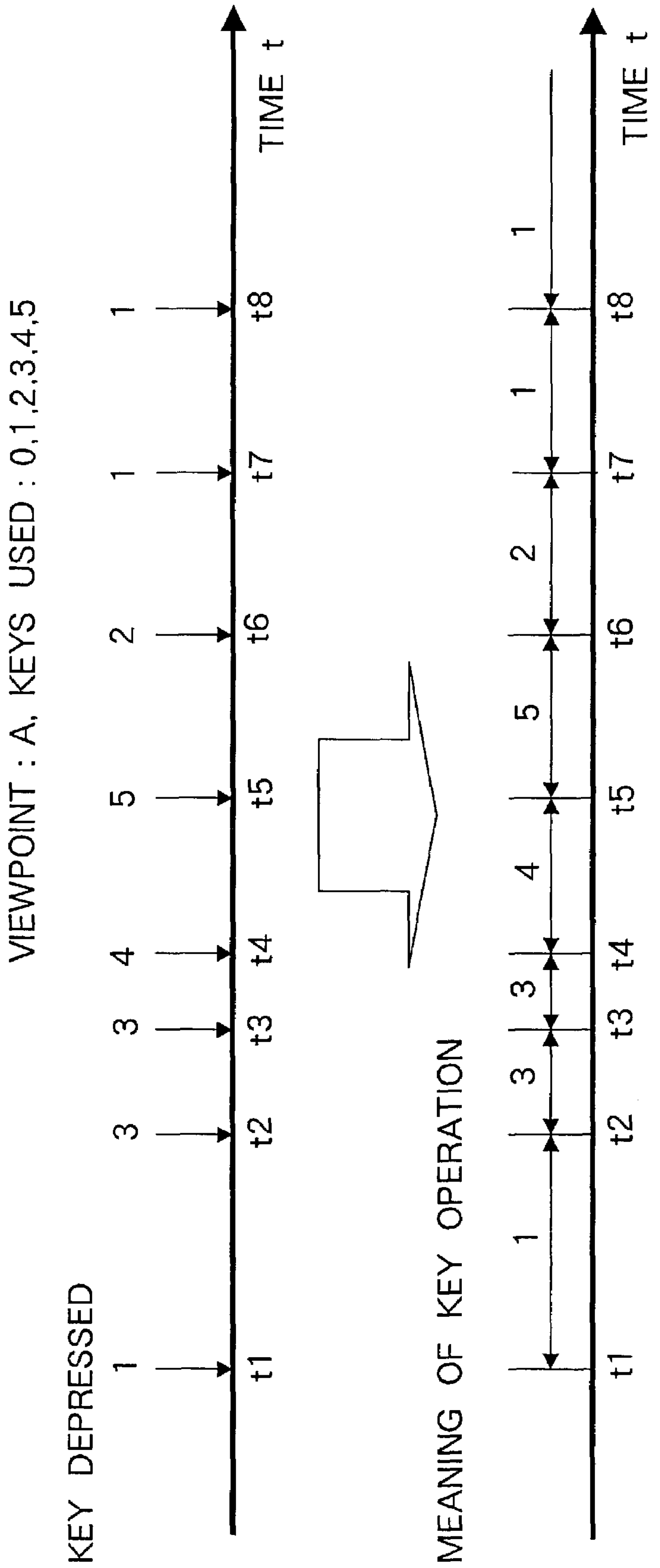
FIG. 7 illustrates a relationship between a viewpoint score input operation, viewpoint and viewpoint score and time information of the meta data creation apparatus according to Embodiment 1.

Using FIG. 7 as an example, key "1" is depressed at time t1 and key "3" is depressed at time t2 . Thus, a viewpoint and viewpoint score indicated by key "1" are adopted from time t1 to time t2 . Furthermore, key "3" is depressed at time t3, and therefore a viewpoint and viewpoint score indicated by key "3" are adopted from time t2 to time t3.

Thus, through a simple operation of consecutively depressing a key of viewpoint score input section 108 it is possible to input a viewpoint and viewpoint score and associate the viewpoint and viewpoint score with time information corresponding to the time at which the key was depressed.

Figure 8:
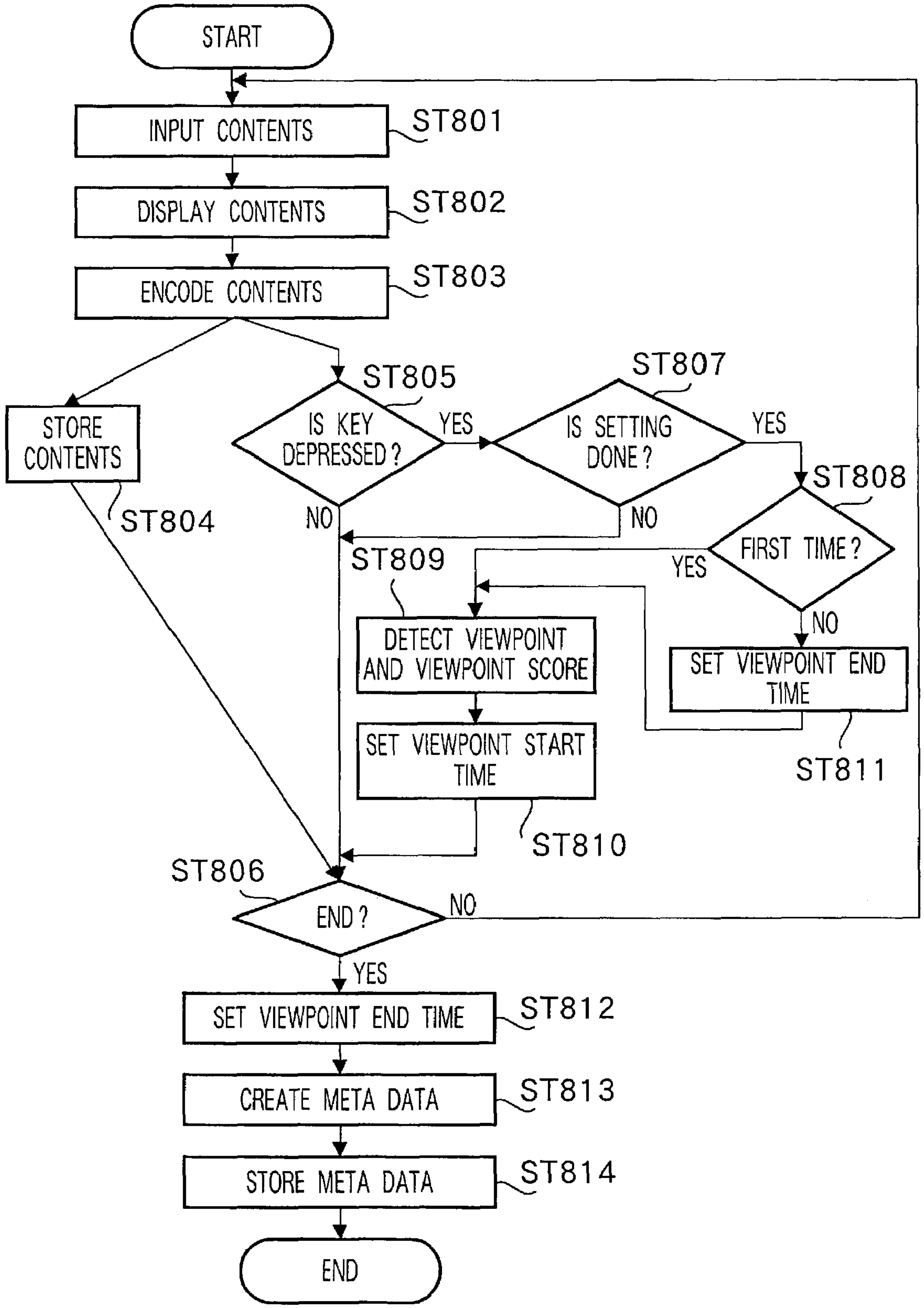
FIG. 8 is a flow chart of a meta data creation operation of the meta data creation apparatus according to Embodiment 1.

Then, an operation of meta data creation apparatus f10 in the above configuration of creating meta data of the viewpoint and viewpoint score as shown in FIG. 3 from the input contents will be explained using FIG. 8. FIG. 8 is a flow chart of a meta data creation operation of the meta data creation apparatus according to Embodiment 1.

First, contents input section 101 captures contents 11 (ST801) and contents display section 103 displays contents 11 captured (ST802). Then, contents 11 captured by contents encoding section 104 are encoded into a predetermined format to create encoded contents 105 and time information 106 of the contents encoding (ST803). Then, control section 102 stores encoded contents 105 in contents storage section 107 (ST804).

Concurrently with storage of encoded contents 105 in contents storage section 107, control section 102 performs meta data creation processing on a viewpoint and viewpoint score.

First, in order to decide whether a viewpoint is input from viewpoint score input section 108 or not, control section 102 decides whether any key of viewpoint score input section 108 has been depressed (ST805) Thus, control section 102 detects that a key of viewpoint score input section 108 has been depressed and thereby detects that a viewpoint and viewpoint score have been input.

Then, in ST805, if control section 102 does not detect depression of any key for a certain period of time, control section 102 considers that there has been no input of viewpoint and viewpoint score corresponding to the encoded contents in ST803 and decides whether there are next contents or not, and thereby decides whether contents 11 to be captured have been finished or not (ST806). Then, if all contents 11 have not been finished, control section 102 moves back to the process in ST801.

On the other hand, if control section 102 detects depression of the key in ST805, control section 102 decides whether the depressed key is the key set in viewpoint score assignment table 112 or not (ST807). Then, when control section 102 decides that the depressed key is not the key set in viewpoint score assignment table 112, control section 102 regards this key input as inappropriate and moves on to the process in ST806.

On the other hand, when control section 102 decides that the depressed key is the key set in viewpoint score assignment table 112, control section 102 needs to decide whether this key input indicates the start of the viewpoint and viewpoint score indicated by the key or the end of the viewpoint and viewpoint score input immediately before this key input. Thus, control section 102 decides whether this key input is the first key depressing or not (ST808).

If control section 102 decides that the key depressed is the first key depressed in ST808, this key input indicates the start of the viewpoint and viewpoint score indicated by the key, and therefore control section 102 references viewpoint score assignment table 112 and detects the viewpoint and viewpoint score indicated by the depressed key (ST809). Then, control section 102 sets the time information of the contents corresponding to the time at which this key was depressed as the start time for the viewpoint and viewpoint score (ST810).

On the other hand, if control section 102 decides that the key depressed is not the first key depressed in ST808, this indicates the start of the viewpoint and viewpoint score indicated by the key and the end of the viewpoint and viewpoint score input immediately before this key input, and therefore control section 102 sets the time information of contents 11 corresponding to the input time at which this key was depressed as the end time (viewpoint end time) of the viewpoint and viewpoint score (ST811). Then, control section 102 references viewpoint score assignment table 112 and detects the viewpoint and viewpoint score indicated by the depressed key (ST809). Then, control section 102 sets the input time at which this key was depressed as the start time (viewpoint start time) of the viewpoint and viewpoint score (ST810).

The above steps ST801 to ST810 are repeated until contents 11 are finished (ST806). Then, when all processing of contents 11 is finished, the time information of the contents corresponding to the end time is the end time (viewpoint end time) of the viewpoint and viewpoint score indicated by the last key input, and therefore control section 102 sets the time information corresponding to the end time of contents 11 as the end time of the viewpoint (ST812).

Then, using DTD shown in FIG. 2, the viewpoint and viewpoint score obtained in ST809 and the viewpoint start time and viewpoint end time obtained in ST810 to ST812, control section 102 creates meta data with the time information of contents assigned to the viewpoint and viewpoint score as shown in FIG. 3 (ST813). Then, control section 102 stores the last meta data created in meta data storage section 111 (ST814).

As shown above, Embodiment 1 allows the author to monitor and encode contents and input a viewpoint and viewpoint score, thus making it possible to automatically create meta data. This allows meta data that matches sensibilities of the meta data author to be created in real time.

Furthermore, Embodiment 1 allows the author to input a viewpoint and viewpoint score simultaneously through a single depression of one key, which drastically speeds up input of a viewpoint and viewpoint score. As a result, the author can input a viewpoint and viewpoint score for the contents in real time.

Furthermore, Embodiment 1 can automatically associate the input times at which keys are depressed consecutively with the time information of contents and set the time information of the contents corresponding to the time at which the first key of the keys depressed consecutively was depressed as the viewpoint start time and the time information of the contents corresponding to the time at which the second key was depressed as the viewpoint end time. Furthermore, Embodiment 1 can automatically assign these set viewpoint start time and viewpoint end time to the viewpoint and viewpoint score. That is, by depressing keys of viewpoint score input section 108 consecutively, the author can associate the time information corresponding to a period of time during which the key is depressed with the viewpoint and viewpoint score indicated by the depressed key. Thus, the meta data author extracts time information of contents successively, associates the time information with the viewpoint and viewpoint score, and the author need not create the meta data shown in FIG. 3 by manually entering data. As a result, the author can create meta data of the viewpoint and viewpoint score in real time.

Furthermore, since contents encoding section 104 creates contents having time information for all types of input contents, Embodiment 1 can create meta data of viewpoint and viewpoint score for all types of contents.

Furthermore, since contents display section 103 displays input contents, Embodiment 1 allows the author to assign the input contents to the viewpoint and viewpoint score while checking the input contents.

Furthermore, it is also possible to convert the format of the meta data created to other meta data using a section that converts the meta data created to other meta data.

Moreover, Embodiment 1 has described contents storage section 107 and meta data storage section 111 as having different configurations, but it is also possible to integrate them into a same configuration.

Furthermore, it is also possible to connect meta data creation apparatus f10 and other user terminal through a network so as to send the contents created by meta data creation apparatus f10 and meta data of these contents to other user terminals in real time.

Furthermore, Embodiment 1 has explained the case where DTD of XML is used as the format of meta data, but other formats can also be used as the format of meta data. For example, it is also possible to use RDF (Resource Definition Framework) and SMIL (Synchronized Multimedia Integration Language), which are structured descriptions, as the format. It is also possible to use a user-defined format. Using the structured description format for meta data makes it possible to transform the meta data into a general format. This provides versatility for the meta data. Furthermore, structuring the meta data allows chapters and sections to be added to the meta data, which eliminates the need to look through the entire meta data to find a desired viewpoint and viewpoint score, thus improving the ease of searching. Furthermore, grouping viewpoints and viewpoint scores with similar meanings into one hierarchical structure makes it possible to process meta data for each viewpoint and viewpoint score, thus making the meta data easy to use.

Furthermore, using a section that converts meta data created to other meta data, the format of the meta data may also be converted to other meta data.

It is also possible to change the name of a viewpoint, change a viewpoint score or create a new viewpoint and viewpoint score from a plurality of viewpoints and viewpoint scores. Moreover, it is also possible to create a plurality of new viewpoints and viewpoint scores from a certain viewpoint and viewpoint score or create a plurality of new viewpoints and viewpoint scores from a plurality of viewpoints and viewpoint scores. In the case of a soccer game for example, if “Suzuki”, “Goal” and “Dribble” are given as viewpoints, then “Suzuki+goal” and “Suzuki+dribble” may be regarded as a viewpoint of “Highlight of Suzuki”. Furthermore, it is also possible to create viewpoints such as “Suzuki+goal” and “Suzuki+dribble” from the viewpoint of “Highlight of Suzuki”.

Furthermore, time information can also be changed. This means that if, for example, the current time information is expressed as hour, minute, second, frame, (12:34:56:15 denotes 12 hours, 34 minutes, 56 seconds and 15 frames), the number of frames can be converted to the number of seconds as 12 hours, 34 minutes, 56.5 seconds.

By the way, Embodiment 1 has described a case where contents encoding section 104 is provided to encode contents, but it is also possible to adopt a mode in which control section 102 encodes contents.

Furthermore, Embodiment 1 has been described as a mode in which control section 102 has a function as a meta data creation section, but the meta data creation section can also be constructed by dedicated hardware.

Furthermore, the meta data creation section may also be implemented by a terminal such as a general PC. In this case, a processing program executed by control section 102 and contents encoding section 104 is stored in a recording medium so that control section 102 downloads and executes the processing program.

Furthermore, meta data creation apparatus f10 according to Embodiment 1 may be applied to an installed type terminal such as a PC or a portable terminal such as a digital camera. By applying meta data creation apparatus f10 to a digital camera, the author can input a viewpoint and viewpoint score while recording contents.

Furthermore, Embodiment 1 adopts DTD of XML shown in FIG. 2 and meta data shown in FIG. 3 created using the DTD shown in FIG. 2, but DTD of XML and meta data may be configured in any mode if DTD of XML and meta data are made at least in a format that allows viewpoint scores to be assigned to time and scene delimiters.

Embodiment 2

A meta data creation apparatus according to Embodiment 2 allows the author to continuously depress a key of viewpoint score input section 108 to input a viewpoint and viewpoint score. That is, while a key is continuously held down, the viewpoint and viewpoint score indicated by the depressed key are adopted. While the key is not held down, a viewpoint and viewpoint score indicated by an initial value (default) key are adopted.

Figure 9:
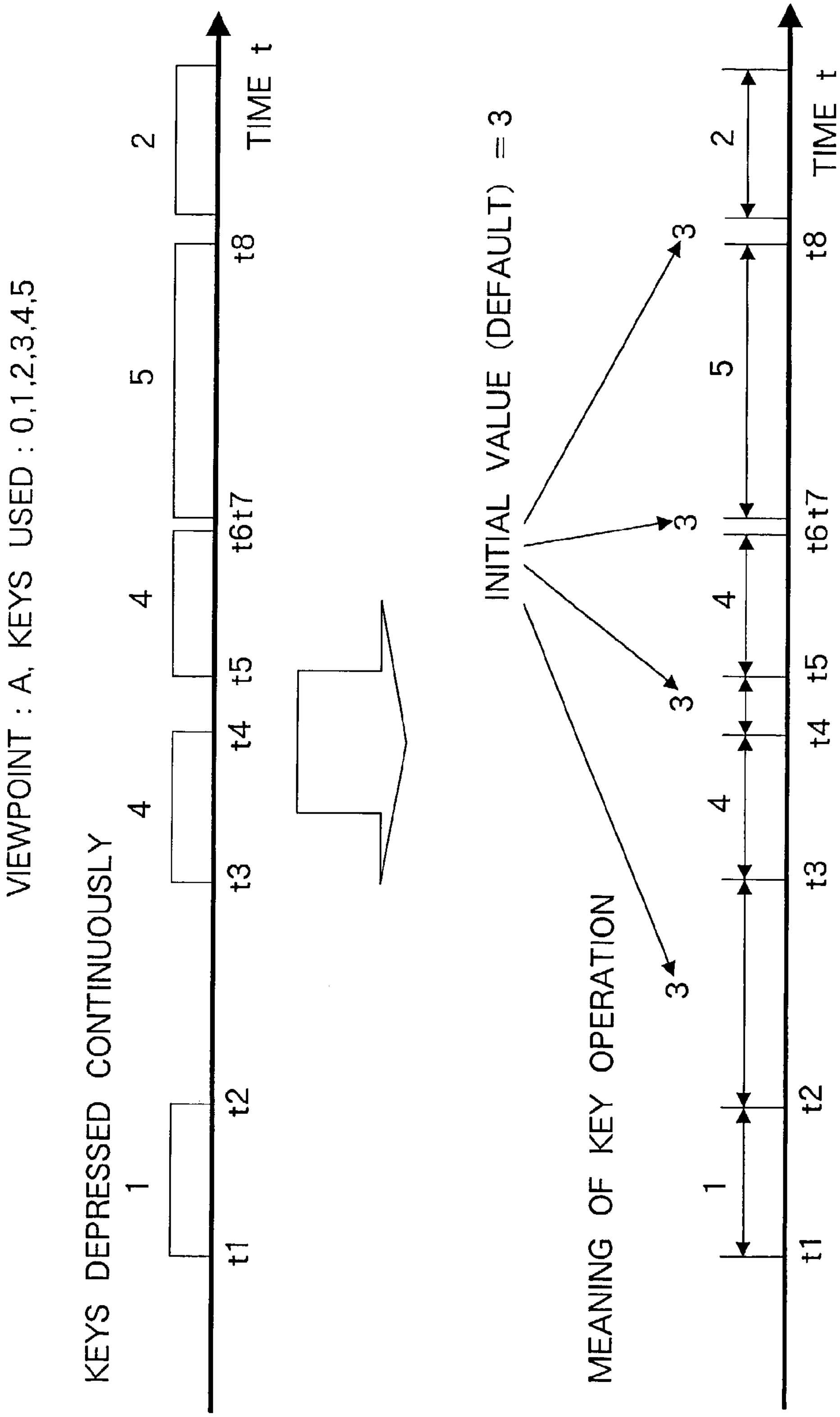
FIG. 9 illustrates a relationship between a viewpoint score input operation, viewpoint and viewpoint score and time information of a meta data creation apparatus according to Embodiment 2 of the present invention.

For example, as shown in FIG. 9, while key "1" is continuously held down from time t1 to time t2, a viewpoint and viewpoint score indicated by key "1" are adopted from time t1 to time t2 . For example, when viewpoint score assignment table 112 shown in FIG. 4 is used, viewpoint "A" and viewpoint score "0.2" are adopted from time t1 to time t2.

Furthermore, since no key is depressed from time t2 to time t3, a viewpoint and viewpoint score corresponding to key "3" are adopted by default. For example, when viewpoint score assignment table 112 shown in FIG. 4 is used, viewpoint "A" and viewpoint score "0.6" are adopted from time t2 to time t3.

Figure 10:
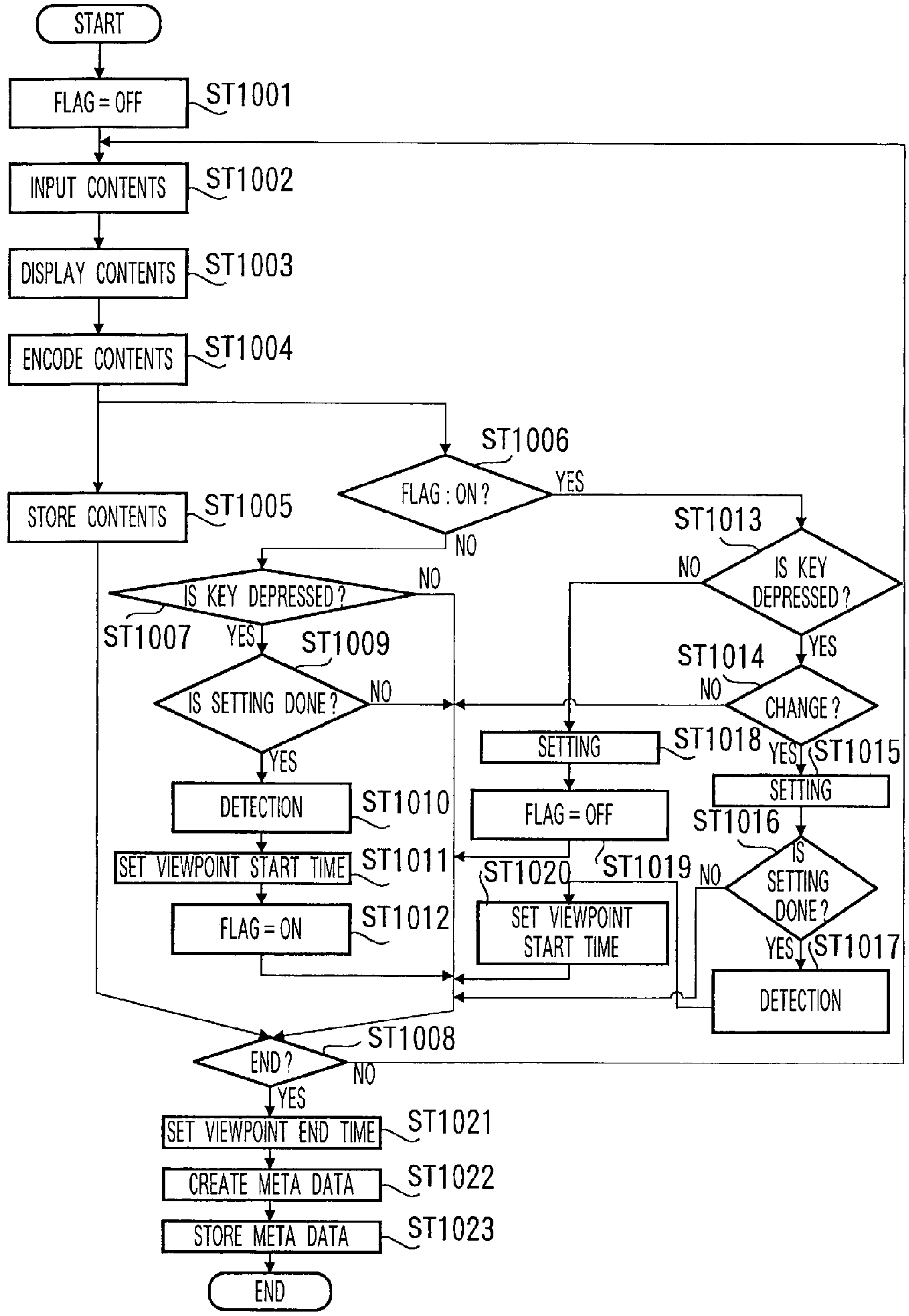
FIG. 10 is a flow chart of a meta data creation operation of the meta data creation apparatus according to Embodiment 2.

Then, a meta data creation operation of the meta data creation apparatus according to Embodiment 2 will be explained using FIG. 10. FIG. 10 is a flow chart of a meta data creation operation of the meta data creation apparatus according to Embodiment 2. The meta data creation apparatus according to Embodiment 2 has the same configuration as that of the meta data creation apparatus according to Embodiment 1. Thus, the configuration of the meta data creation apparatus according to Embodiment 2 is the same as that in FIG. 1.

In a stage in which processing is started, all keys of viewpoint score input section 108 are not depressed, that is, released, and therefore to decide whether a key is continuously held down or not, control section 102 sets a key depression continuation flag to OFF (ST1001). As the key depression continuation flag, a flag in control section 102 is used.

Then, contents input section 101 captures contents 11 (ST1002), contents display section 103 displays contents 11 captured (ST1003). Then, contents 11 captured by contents encoding section 104 is encoded into a predetermined format to create encoded contents 105 and time information 106 of the contents encoding (ST1004). Then, control section 102 stores encoded contents 105 in contents storage section 107 (ST1005).

Concurrently with storage of encoded contents 105 in contents storage section 107, control section 102 performs meta data creation processing on a viewpoint and viewpoint score.

First, in order to examine which key of viewpoint score input section 108 is continuously held down, control section 102 decides whether the key depression continuation flag is set to ON or not (ST1006).

Then, if it is decided in ST1006 that the key depression continuation flag is set to OFF, that is, no key is depressed, control section 102 decides whether any key of viewpoint score input section 108 has been depressed or not in order to decide whether a viewpoint has been input from viewpoint score input section 108 (ST1007). Thus, by detecting that some key of viewpoint score input section 108 has been depressed, control section 102 detects the fact that a viewpoint and viewpoint score have been input.

Then, in ST1007, if control section 102 does not detect depression of any key for a certain period of time, control section 102 considers that there has been no input of viewpoint and viewpoint score corresponding to the contents encoded in ST1004 and decides whether there are next contents or not and thereby decides whether contents 11 to be captured has been finished or not (ST1008). Then, if all contents 11 have not been finished, control section 102 moves back to the process in ST1002.

On the other hand, if control section 102 detects depression of the key in ST1007, control section 102 decides whether the depressed key is the key set in viewpoint score assignment table 112 or not (ST1009). Then, when control section 102 decides in ST1009 that the depressed key is not the key set in viewpoint score assignment table 112, control section 102 regards this key input as inappropriate and moves on to the process in ST1008.

On the other hand, when control section 102 decides in ST1009 that the depressed key is the key set in viewpoint score assignment table 112, this key input indicates the start of the viewpoint and viewpoint score indicated by the key, and therefore control section 102 references viewpoint score assignment table 112 to detect the viewpoint and viewpoint score indicated by the depressed key (ST1010). Then, control section 102 sets the time information of the contents corresponding to the input time at which this key was depressed as the start time for the viewpoint and viewpoint score (ST1011). Furthermore, since the key is held down in ST1007, control section 102 sets the key depression continuation flag to ON (ST1012). Then, control section 102 moves on to the process in ST1008.

On the other hand, if control section 102 decides in ST1006 that the key depression continuation flag is set to ON, that is, if control section 102 decides in ST1007 that the key has already been depressed and decides in ST1012 that the key depression continuation flag is set to ON, control section 102 decides whether the key is held down or not (ST1013) to decide whether the key depressed in current ST1007 is held down continuously.

If it is decided in ST1013 that the key is held down, control section 102 decides whether the depressed key is the key held down continuously, that is, whether the depressed key is the same key as the key for which a start time is set or not (ST1014). If it is decided in ST1014 that the depressed key is the same key, that is, the key has not changed, control section 102 further decides that the key is held down continuously and moves on to the process in ST1008.

On the other hand, if it is decided in ST1014 that the depressed key is not the same key, that is, the key held down continuously has changed, control section 102 decides that continuous key depression has finished and sets the time information of the contents corresponding to this time as the end time of the viewpoint to which the start time is assigned (ST1015). In this way, control section 102 sets the start time and end time for the viewpoint and viewpoint score indicated by the key held down continuously.

Furthermore, control section 102 decides whether the key detected in ST1014 is the key set in viewpoint score assignment table 112 or not (ST1016). Then, when control section 102 decides in ST1016 that the depressed key is not in viewpoint score assignment table 112, control section 102 considers this key input to be inappropriate and moves on to the process in ST1008.

On the other hand, if control section 102 decides in ST1016 that the depressed key is a key found in viewpoint score assignment table 112, control section 102 references viewpoint score assignment table 112 to detect the viewpoint and viewpoint score indicated by the depressed key (ST1017). Then, control section 102 sets time information of the contents corresponding to the input time at which the key was depressed as the start time of the viewpoint and viewpoint score (ST1020). Then, control section 102 moves on to the process in ST1008.

On the other hand, if control section 102 decides in ST1013 that the key is not depressed, control section 102 decides that the continuous key depression has finished. Then, control section 102 sets the time information of the contents corresponding to the current time as the end time of the viewpoint and viewpoint score to which the start time has already been assigned (ST1018). In this way, it is possible to assign the start time and end time to the viewpoint and viewpoint score indicated by the continuously depressed key.

Furthermore, since the continuous key depression is finished, control section 102 sets the key depression continuation flag to OFF (ST1019) and moves on to the process in ST1008.

The above steps ST1002 to ST1020 are repeated until contents 11 are finished (ST1008). Then, when all processing of contents 11 is finished, the time information of the contents corresponding to the end time is the end time of the viewpoint and viewpoint score indicated by the last key input irrespective of whether the current key is continuously held down or not, and therefore control section 102 sets the time information corresponding to the end time of contents 11 as the end time of the viewpoint (ST1021).

Then, using DTD shown in FIG. 2, the viewpoint and viewpoint score obtained in the above described processing and the viewpoint start time and viewpoint end time, control section 102 creates meta data with the time information of contents assigned to the viewpoint and viewpoint score as shown in FIG. 3 (ST1022). Then, control section 102 stores the last meta data created in meta data storage section 111 (ST1023).

As shown above, Embodiment 2 allows the time information corresponding to the time at which the key was depressed to be set as the start time of a viewpoint and score and the time information corresponding to the time at which the key was released to be set as the end time of the viewpoint and viewpoint score. Thus, Embodiment 2 allows the author to create meta data by only operating keys without being aware of time information of contents.

Furthermore, Embodiment 2 allows a viewpoint and viewpoint score corresponding to a depressed key to be adopted only to a key held down continuously. This allows the author to input a viewpoint and viewpoint score intended by the author only to an area that the author considers to be characteristic. That is, it is possible to discriminate the area that the author considers to be characteristic from other areas, that is, areas to which the viewpoint and viewpoint score are assigned by default.

Furthermore, Embodiment 2 can automatically assign time information to an adopted viewpoint and viewpoint score and can thereby create meta data in real time as in the case of Embodiment 1.

It is also possible to adopt a mode in which no viewpoint and viewpoint score are assigned to parts other than the part for which a key is continuously held down. This mode allows an area with no viewpoint and viewpoint score to be created for contents. Using the meta data created in this way makes it possible to create index information made up of only the part intentionally keyed by the author, that is, the necessary part.

Furthermore, Embodiment 2 has been described as a mode in which control section 102 has the function as the meta data creation section, but the meta data creation section can also be constructed by dedicated hardware.

Furthermore, the meta data creation apparatus can also be implemented by a general PC. In this case, the processing program to be executed by control section 102 and contents encoding section 1104 is stored in a storage medium and downloaded and executed by control section 102.

Embodiment 3

Figure 11:
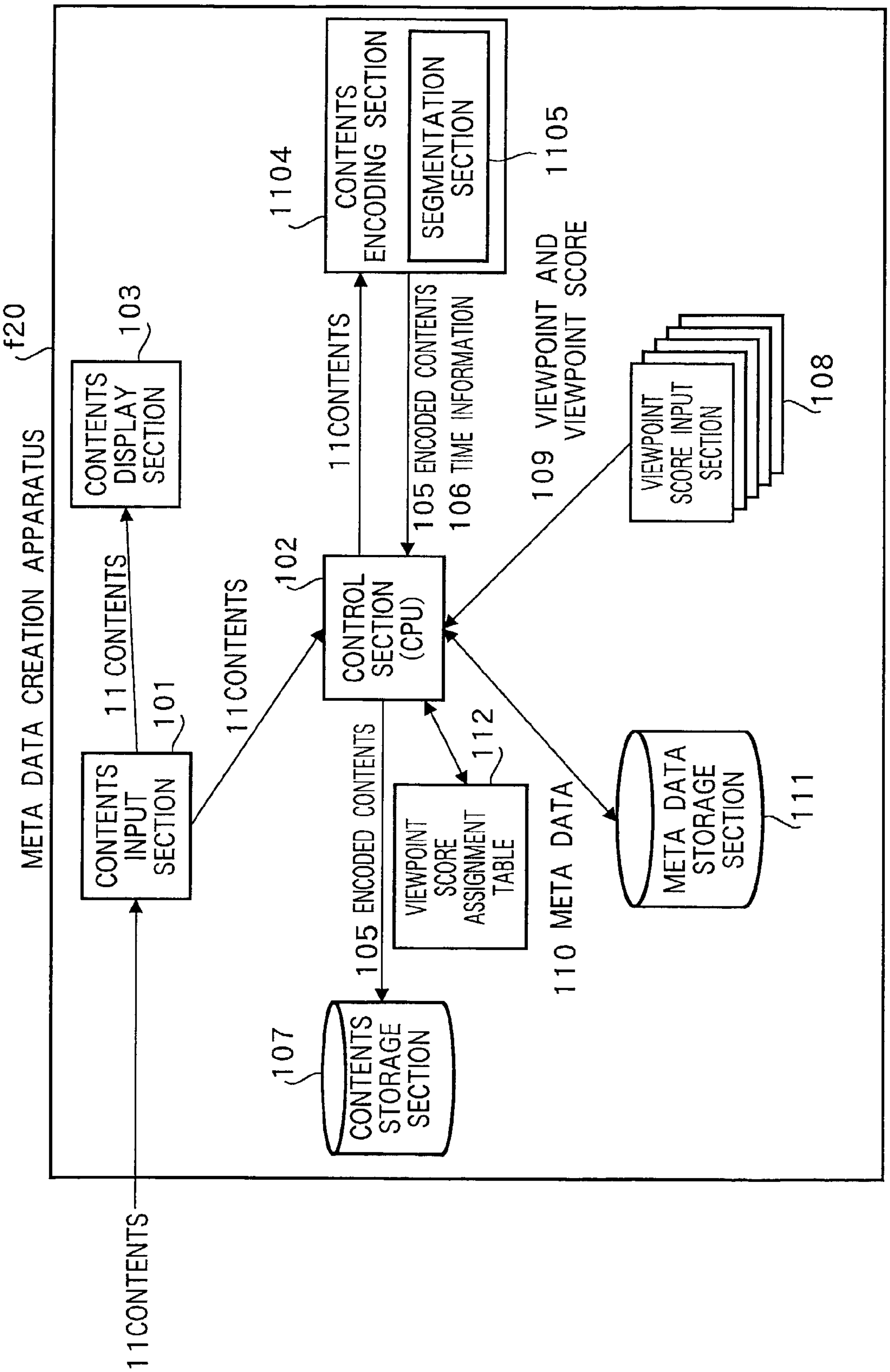
FIG. 11 is a block diagram showing a configuration of a meta data creation apparatus according to Embodiment 3 of the present invention.

As shown in FIG. 11, a meta data creation apparatus f20 according to Embodiment 3 includes contents encoding section 1104 provided with segmentation section 1105 that divides contents 11 into segments which are smaller time units according to the meaning content of contents 11. Then, contents encoding section 1104 uses time information on points at which a segment changes as time information 106. That is, contents encoding section 1104 uses a segment start time and end time as time information 106.

Furthermore, when contents 11 are moving images or moving images/voice, the segmentation method of segmentation section 1105 segments the contents by determining cut points (characteristic points) and designates the times corresponding to the cut points as time information 106. Other methods can also be used as the segmentation method of segmentation section 1105. FIG. 11 is a block diagram showing a configuration of the meta data creation apparatus according to Embodiment 3.

When viewpoint score input section 108 is used as an input apparatus, control section 102 assigns a viewpoint and viewpoint score 109 indicated by a key depressed within a period of time segmented by time information 106 to the segmented time.

Figure 12:
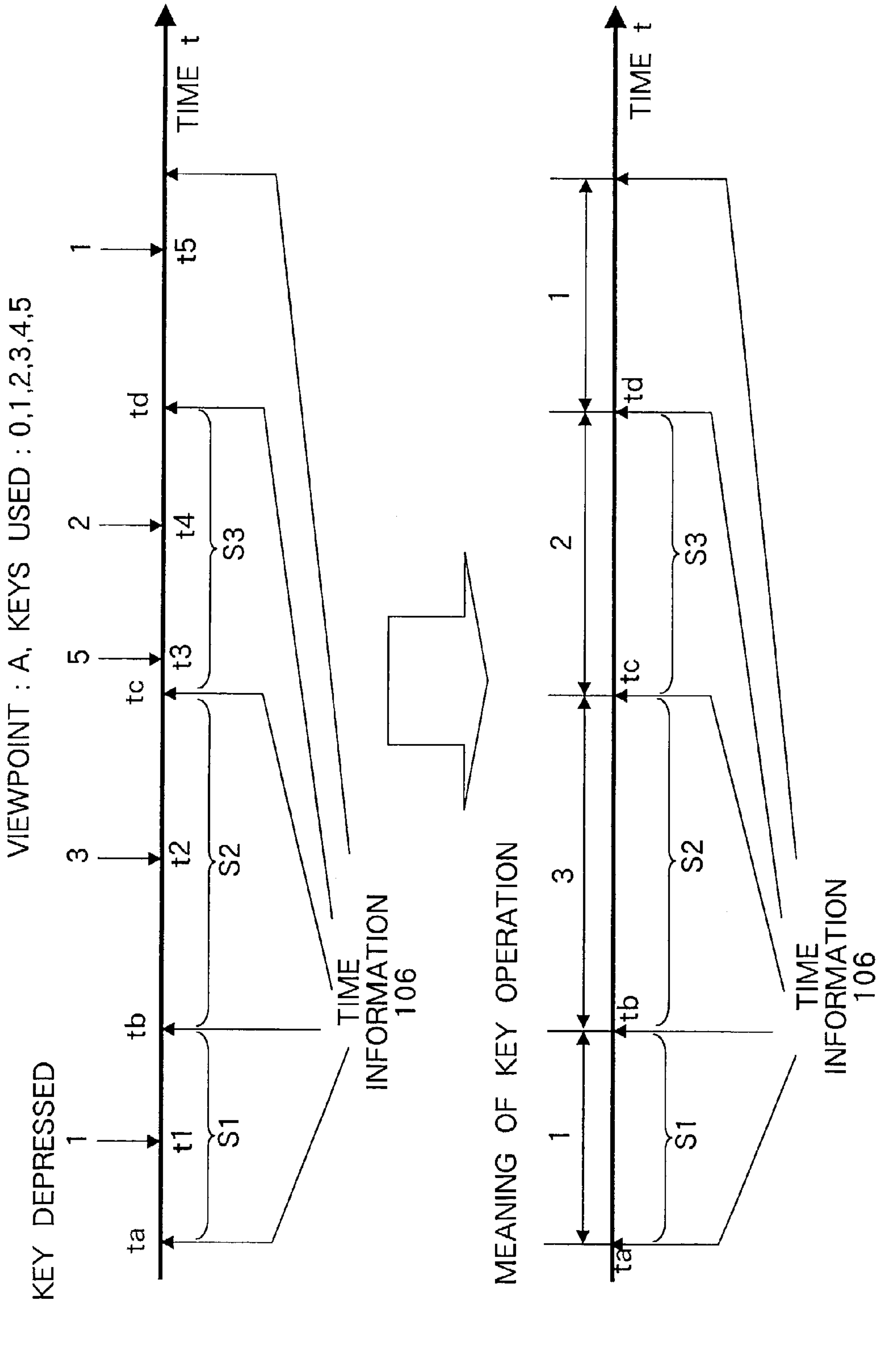
FIG. 12 illustrates a relationship between a viewpoint score input operation, viewpoint and viewpoint score and time information of the meta data creation apparatus according to Embodiment 3.

As shown in FIG. 12, when key “1” is depressed within time t1 during which segment S1 having a start time of ta and an end time of tb is displayed, control section 102 adopts the viewpoint and viewpoint score indicated by key “1” for segment S1. That is, the start time of the viewpoint and viewpoint score indicated by key “1” is designated as start time ta of segment S1 and the end time of the viewpoint and viewpoint score indicated by key “1” is designated as end time tb of segment S1.

Furthermore, when key “3” is depressed within time t2 during which segment S2 having a start time of tb and an end time of tc is displayed, control section 102 adopts the viewpoint and viewpoint score indicated by key “3” for segment S2. That is, the start time of the viewpoint and viewpoint score indicated by key “3” is designated as start time tb of segment S2 and the end time of the viewpoint and viewpoint score indicated by key “1” is designated as end time tc of segment S2.

Furthermore, when key “5” is depressed within time t3 during which segment S3 having a start time of tc and an end time of td is displayed and key “2” is depressed at t4, control section 102 adopts the viewpoint and viewpoint score indicated by key “2” which was depressed later for segment S3. That is, the start time of the viewpoint and viewpoint score indicated by key “2” is designated as start time tc of segment S3 and the end time of the viewpoint and viewpoint score indicated by key "2" is designated as end time tb of segment S3. By the way, FIG. 12 shows an example of viewpoint score input operation assignment according to Embodiment 3.

Figure 13:
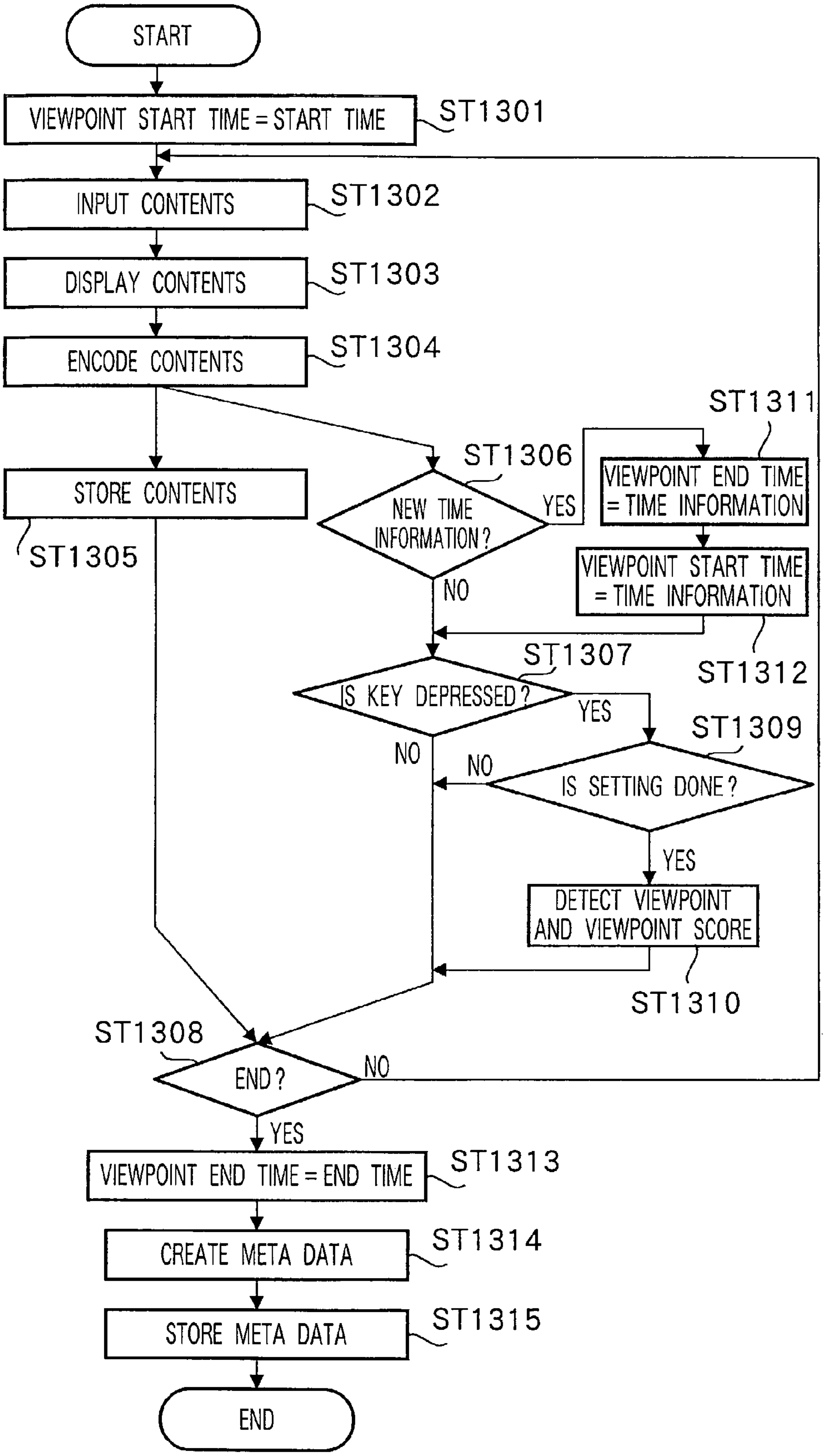
FIG. 13 is a meta data creation flow chart according to Embodiment 3.

A meta data creation operation of the meta data creation apparatus according to Embodiment 3 will be explained using FIG. 13. FIG. 13 is a meta data creation flow chart according to Embodiment 3.

According to Embodiment 3, the start time of the first segment always becomes the start time of a viewpoint, and therefore control section 102 sets the start time of the first segment immediately after the processing is started as the start time of the viewpoint (ST1301).

Then, contents input section 101 captures contents 11 (ST1302) and contents display section 103 displays contents 11 captured (ST1303). Then, contents 11 captured by segmentation section 1105 are segmented and contents encoding section 1104 encodes this segment into a predetermined format to create encoded contents 105. Furthermore, contents encoding section 1104 adopts delimiters between segments as time information 106 (ST1304).

Then, control section 102 stores encoded contents 105 in contents storage section 107 (ST1305).

Furthermore, concurrently with storage of encoded contents 105 in contents storage section 107, control section 102 performs meta data creation processing on a viewpoint and viewpoint score.

First, control section 102 decides whether there is any new unprocessed time information or not (ST1306). This is because Embodiment 3 assigns a segment start time and end time as contents time information to a viewpoint and viewpoint score, and therefore start times and end times of all segments need to be checked.

If there is no new time information in ST1306, the process in ST1306 may be performed first. That is, there is no key input. Therefore, control section 102 decides whether any key is depressed or not (ST1307). Then, in ST1307, if control section 102 does not detect depression of any key for a certain period of time, control section 102 considers that there has been no key input of viewpoint and viewpoint score corresponding to the contents encoded in ST1304 and decides whether there are next contents or not. Then, control section 102 decides whether contents 11 to be captured has been finished or not (ST1308) and if contents 11 are not finished, control section 102 moves back to the process in ST1302.

On the other hand, if control section 102 detects depression of the key in ST1307, this means that there has been input of the viewpoint and viewpoint score indicated by the key. Thus, control section 102 decides whether the depressed key is the key set in viewpoint score assignment table 112 or not (ST1309). Then, when control section 102 decides in ST1309 that the depressed key is not the key set in viewpoint score assignment table 112, control section 102 regards this key input as inappropriate and moves on to the process in ST1308.

On the other hand, when control section 102 decides in ST1309 that the depressed key is the key set in viewpoint score assignment table 112, control section 102 references viewpoint score assignment table 112 to detect the viewpoint and viewpoint score indicated by the depressed key (ST1310). Then, control section 102 sets a start time of the viewpoint detected in ST1310 as the viewpoint and viewpoint score detected in ST1310 and moves on to the process in ST1308.

On the other hand, if there is new time information in ST1306, this corresponds to a case where processes in ST1306 to ST1310 have already been performed. That is, the viewpoint start time has already been set. Furthermore, this new time information means the start of the next segment. Therefore, control section 102 sets this new time information as the end time corresponding to the start time of an already set viewpoint (ST1311). Furthermore, control section 102 sets this new time information as the viewpoint start time (ST1312) and moves on to the process in ST1307. The process of setting the viewpoint and viewpoint score for the new segment is started in this way.

Then, in ST1307, control section 102 decides whether any key has been depressed or not. Then, in ST1307, if control section 102 does not detect depression of any key for a certain period of time, control section 102 considers that there has been no key input for the viewpoint and viewpoint score corresponding to the contents encoded in ST1304 and decides whether there are next contents or not and thereby decides whether contents 11 to be captured has been finished or not (ST1308) and if all contents 11 have not been finished, control section 102 moves back to the process in ST1302.

On the other hand, if control section 102 detects depression of the key in ST1307, this means that there has been input of the viewpoint and viewpoint score indicated by the key. Therefore, control section 102 decides whether this depressed key is the key set in viewpoint score assignment table 112 or not (ST1309). Then, when control section 102 decides in ST1309 that the depressed key is not the key set in viewpoint score assignment table 112, control section 102 regards this key input as inappropriate and moves on to the process in ST1308.

On the other hand, when control section 102 decides in ST1309 that the depressed key is the key set in viewpoint score assignment table 112, control section 102 references viewpoint score assignment table 112 to detect the viewpoint and viewpoint score indicated by the depressed key (ST1310). Then, control section 102 sets the start time of the viewpoint set in ST1312 as the viewpoint and viewpoint score detected in ST1310 and moves on to the process in ST1308.

The above steps ST1302 to ST1312 are repeated until contents 11 are finished (ST1308). Then, when all processing of contents 11 is finished, the time information of the contents corresponding to the end time corresponds to the end time of the viewpoint and viewpoint score indicated by the last key input, and therefore control section 102 sets the time information corresponding to the end time of contents 11 as the end time of the viewpoint (ST1313).

Then, using DTD shown in FIG. 2, the viewpoint and viewpoint score obtained in the above described processing and the viewpoint start time and viewpoint end time, control section 102 creates meta data with the time information of contents assigned to the viewpoint and viewpoint score as shown in FIG. 3 (ST1314). Then, control section 102 stores the last meta data created in meta data storage section 111 (ST1315).

Furthermore, when there is a plurality of key depressions within the time period of the same segment and the plurality of the depressed keys indicates the same viewpoint, Embodiment 3 adopts the last input viewpoint score as the viewpoint score. Furthermore, when the plurality of the keys depressed within the time period of the same segment indicates different viewpoints, control section 102 creates meta data including all different viewpoints. Furthermore, when no key is depressed within the time period of the segment, control section 102 sets an initial value (default).

Thus, even if there is a plurality of key depressions within the time period of the same segment, this embodiment can handle those key depressions without misoperation. This embodiment can also handle cases where there is no key depression within the same segment time.

However, when the processing of segmentation section 1105 is slow, the time information output from contents encoding section 1104 may include a time difference from the actual time exceeding one frame of contents. In this case, the time information assigned to the viewpoint input by the key becomes time information of one preceding frame, which prevents correct time information from being assigned to the viewpoint. Therefore, Embodiment 3 measures the time required to extract cut points of segmentation section 1105 beforehand and associates the time obtained by adding the measured time to the time of key input with time information 106 output from contents encoding section 1104.

As explained above, Embodiment 3 allows viewpoint score 109 indicated by the key depressed within the segmented time to be assigned to the segmented time. That is, Embodiment 3 can automatically set the segment start time as the start time of the viewpoint input by the key and set the segment end time as the end time of the viewpoint input by the key. As in the case of Embodiment 1, this eliminates the need for the author to manually describe meta data.

Furthermore, Embodiment 3 sets the time of a cut point before the time at which the author input a viewpoint and viewpoint score as the start time of the viewpoint. That is, even if there is a certain time difference until the author recognizes characteristic parts and operates keys while monitoring the displayed contents, it is possible to set the viewpoint start time tracing back to the time of the previous cut point. This makes it possible to absorb the time difference from the key input. This is quite effective because there is usually some time difference after the author recognizes characteristic parts until the author operates keys.

Embodiment 3 has been described as a mode in which contents encoding section 104 is provided to encode contents, but it is also possible to adopt a mode in which control section 102 encodes contents.

Furthermore, Embodiment 3 has been described as a mode in which contents encoding section 1104 for encoding contents and segmentation section 1105 are provided, but it is also possible to adopt a mode in which control section 102 performs operations of contents encoding section 1104 and segmentation section 1105.

Furthermore, Embodiment 3 has been described as a mode in which control section 102 has the function as a meta data creation section, but the meta data creation section can also be constructed by dedicated hardware.

Furthermore, the meta data creation apparatus can also be implemented by a general PC. In this case, the processing program to be executed by control section 102 and contents encoding section 104 is stored in a storage medium and downloaded and executed by control section 102.

Furthermore, it is also possible to adopt a mode combining Embodiment 3 and Embodiment 1 or Embodiment 2.

Embodiment 4

A meta data creation apparatus according to Embodiment 4 takes into consideration time td which is a time difference after the author recognizes characteristic points until the author actually inputs a viewpoint. That is, this embodiment intends to associate the viewpoint input by the author with the time at which the author intended to input the viewpoint.

Figure 14:
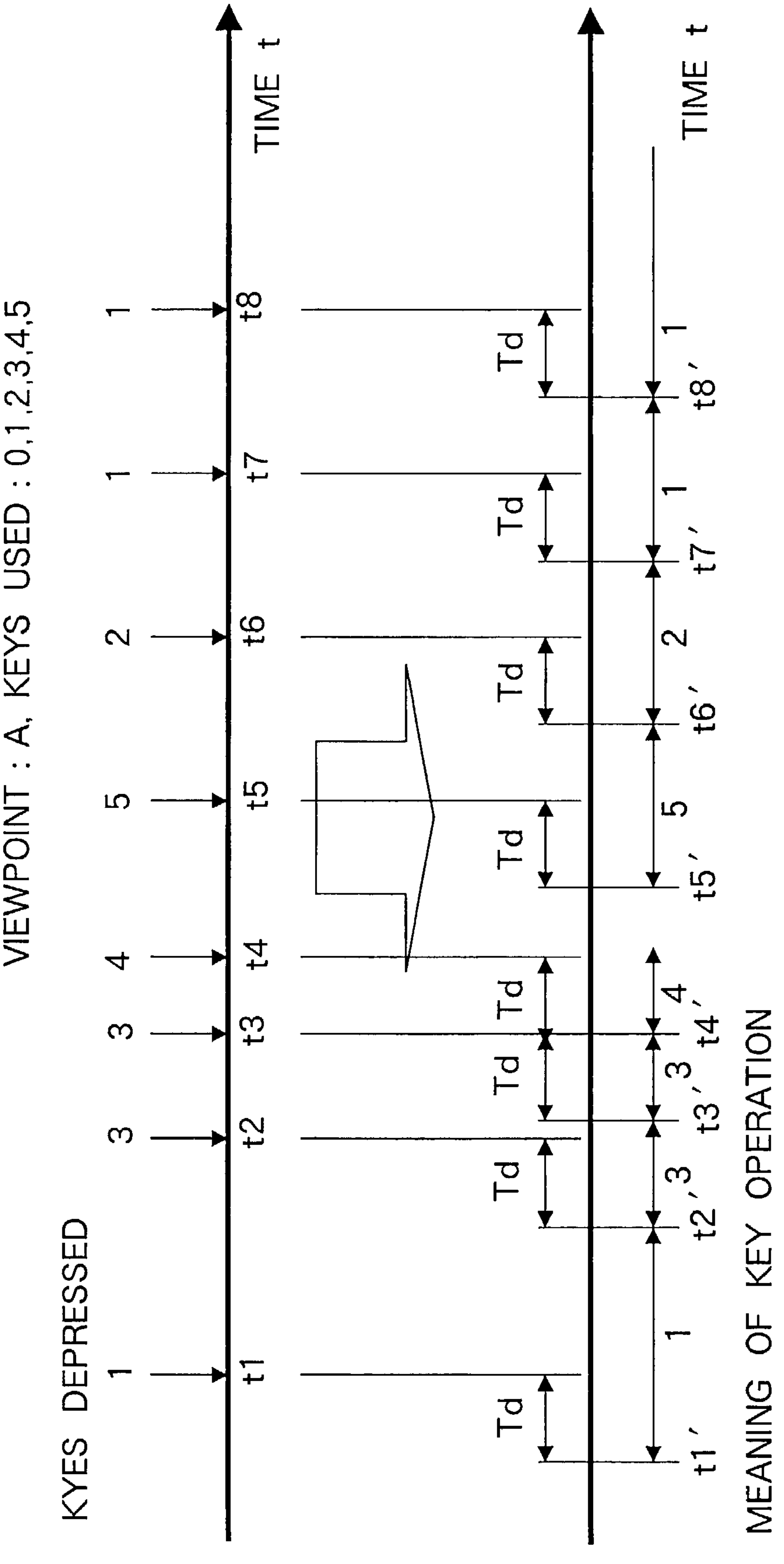
FIG. 14 illustrates a relationship between a viewpoint score input operation, viewpoint and viewpoint score and time information of a meta data creation apparatus according to Embodiment 4of the present invention.

More specifically, as shown in FIG. 14, when key "1" is depressed at time t1 and key "3" is depressed at time t2, time t1' obtained by subtracting time td from time t1 is set as a start time and time t2' obtained by subtracting time td from time t2 is set as an end time with respect to the viewpoint and viewpoint score indicated by key "1". For times t2 to t8 at which keys were depressed, times t2' to t8' obtained by subtracting time td from respective times t2 to t8 at which keys were depressed are adopted as time information of the viewpoint.

Figure 15:
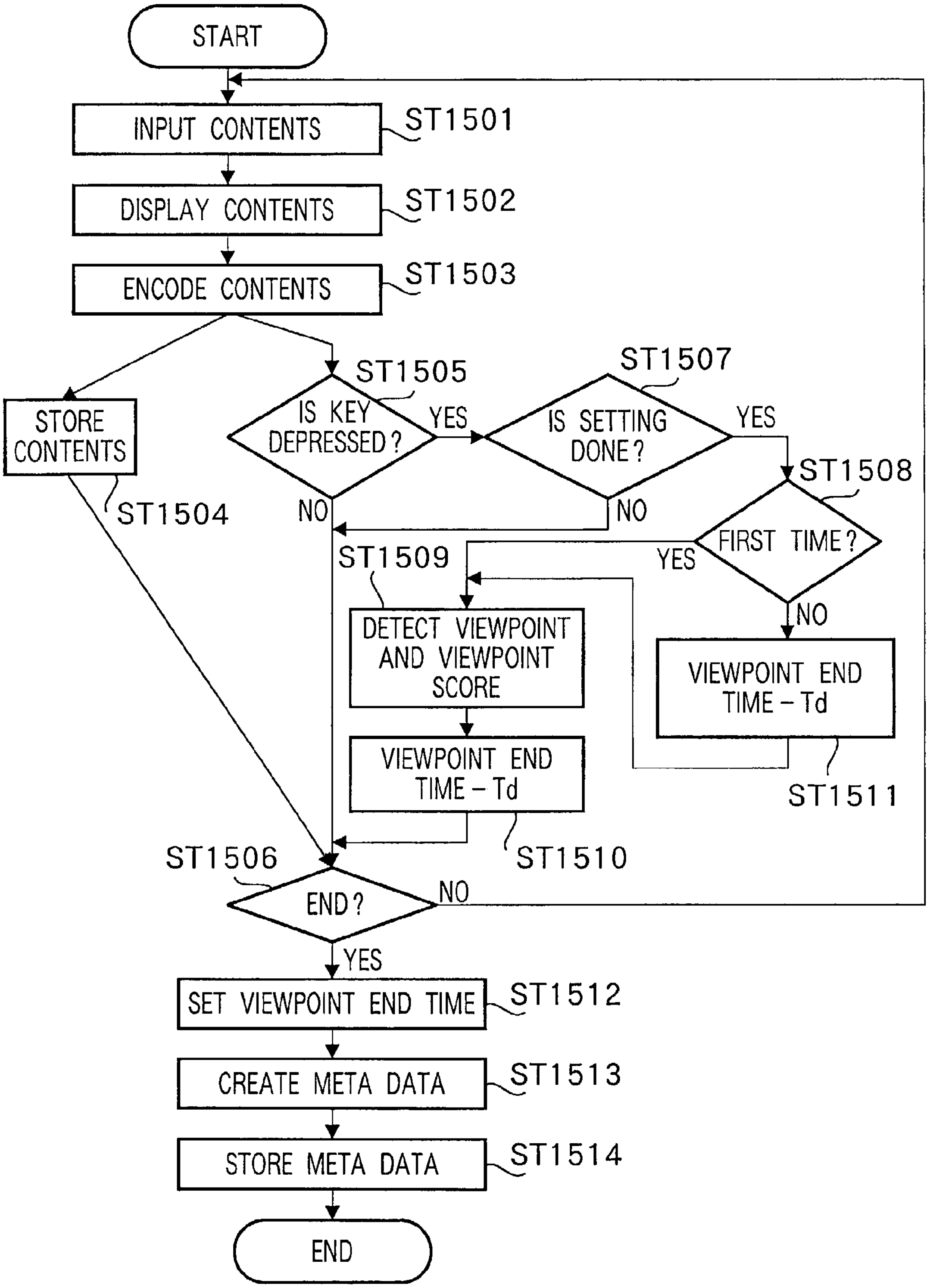
FIG. 15 is a flow chart of a meta data creation operation of the meta data creation apparatus according to Embodiment 4.

Then, an operation of a meta data creation apparatus according to Embodiment 4 will be explained using FIG. 15. FIG. 15 is a flow chart of a meta data creation operation of the meta data creation apparatus according to Embodiment 4. By the way, since the meta data creation apparatus according to Embodiment 4 adopts the same configuration as that of the meta data creation apparatus according to Embodiment 1, this embodiment will be explained using the same reference numerals used in Embodiment 1.

First, contents input section 101 captures contents 11 (ST1501) and contents display section 103 displays contents 11 captured (ST1502). Then, contents 11 captured by contents encoding section 104 are encoded into a predetermined format to create encoded contents 105 and time information 106 of the contents encoding (ST1503). Then, control section 102 stores encoded contents 105 in contents storage section 107 (ST1504).

Concurrently with storage of encoded contents 105 in contents storage section 107, control section 102 performs meta data creation processing on a viewpoint and viewpoint score.

First, in order to decide whether a viewpoint is input from viewpoint score input section 108 or not, control section 102 decides whether any key of viewpoint score input section 108 has been depressed (ST1505). Thus, control section 102 detects that a key of viewpoint score input section 108 has been depressed and thereby detects that a viewpoint and viewpoint score have been input.

Then, in ST1505, when control section 102 does not detect depression of any key for a certain period of time, control section 102 considers that there has been no input of viewpoint and viewpoint score corresponding to the encoded contents in ST1503 and decides whether there are next contents or not and thereby decides whether contents 11 to be captured have been finished or not (ST1506) and if contents 11 have not been finished, control section 102 moves back to the process in ST1501.

On the other hand, if control section 102 detects depression of some key in ST1505, control section 102 decides whether the depressed key is the key set in viewpoint score assignment table 112 or not (ST1507). Then, when control section 102 decides in ST1507 that the depressed key is not the key set in viewpoint score assignment table 112, control section 102 regards this key input as inappropriate and moves on to the process in ST1506.

On the other hand, when control section 102 decides in ST1507 that the depressed key is the key set in viewpoint score assignment table 112, control section 102 needs to decide whether this key input indicates the start of the viewpoint and viewpoint score indicated by the key or the end of the viewpoint and viewpoint score input immediately before this key input. Thus, control section 102 decides whether this key input corresponds to the first key depressing or not (ST1508).

If control section 102 decides that the key depressed corresponds to the first key depressed in ST1508, this key input indicates the start of the viewpoint and viewpoint score indicated by the key, and therefore control section 102 references viewpoint score assignment table 112 and detects the viewpoint and viewpoint score indicated by the depressed key (ST1509). Then, control section 102 sets a time obtained by subtracting the above described time td from the time information of the contents corresponding to the input time at which this key was depressed as the start time for the viewpoint and viewpoint score (ST1510).

On the other hand, if control section 102 decides that the key depressed does not correspond to the first key depressed in ST1508, this indicates the start of the viewpoint and viewpoint score indicated by the key and the end of the viewpoint and viewpoint score input immediately before this key input, and therefore control section 102 sets a time obtained by subtracting time td from the time information of contents 11 corresponding to the input time at which this key was depressed as the end time of the viewpoint and viewpoint score (ST1511). Then, control section 102 references viewpoint score assignment table 112 and detects the viewpoint and viewpoint score indicated by the depressed key (ST1509). Then, control section 102 sets a time obtained by subtracting time td from the input time at which this key was depressed as the start time of the viewpoint and viewpoint score (ST1510).

The above processes ST801 to ST810 are repeated until contents 11 are finished (ST1506). Then, when all processing of contents 11 is finished, the time information of the contents corresponding to the end time is the end time of the viewpoint and viewpoint score indicated by the last key input, and therefore control section 102 sets the time information corresponding to the end time of contents 11 as the end time of the viewpoint (ST1512).

Then, using DTD shown in FIG. 2, the viewpoint and viewpoint score obtained in ST1509 and the viewpoint start time and viewpoint end time obtained in ST1510 to ST1512, control section 102 creates meta data with the time information of contents assigned to the viewpoint and viewpoint score as shown in FIG. 3 (ST1513). Then, control section 102 stores the last meta data created in meta data storage section 111 (ST1514).

As shown above, Embodiment 4 allows the author to consider time td which is a time difference after the author sees the displayed contents and recognizes characteristic points until the author actually inputs a viewpoint. That is, the author can associate the time at which the author actually intends to input a viewpoint with the viewpoint indicated by the key. As a result, it is possible to set precise time information in the viewpoint and viewpoint score.

By the way, time information 106 output from contents encoding section 104 is behind the actual time by the time required for contents encoding section 104 to perform contents encoding processing. This time difference becomes a serious problem when the processing capacity of contents encoding section 104 is low. Embodiment 4can solve this problem by associating the above described time td with the time after contents are input to contents encoding section 104, and encoded until the contents are output together with time information 106. More specifically, time td is added to time information 106 corresponding to the time of actual key input. Thus, Embodiment 4 can also consider the processing capacity of contents encoding section 104, and thereby set time information in the viewpoint more accurately.

Embodiment 4 has been described as a mode in which contents encoding section 104 is provided to encode contents, but Embodiment 4 can also adopt a mode in which control section 102 encodes contents.

Furthermore, Embodiment 4 has been described as a mode in which control section 102 has the function as a meta data creation section, but the meta data creation section can also be constructed by dedicated hardware.

Furthermore, the meta data creation apparatus can also be implemented by a general PC. In this case, a processing program executed by control section 102 and contents encoding section 104 is stored in a recording medium and control section 102 downloads and executes the processing program.

Embodiment 5

A meta data creation apparatus according to Embodiment 5 stores pre-encoded contents and creates meta data of a viewpoint for this stored encoded contents.

Figure 16:
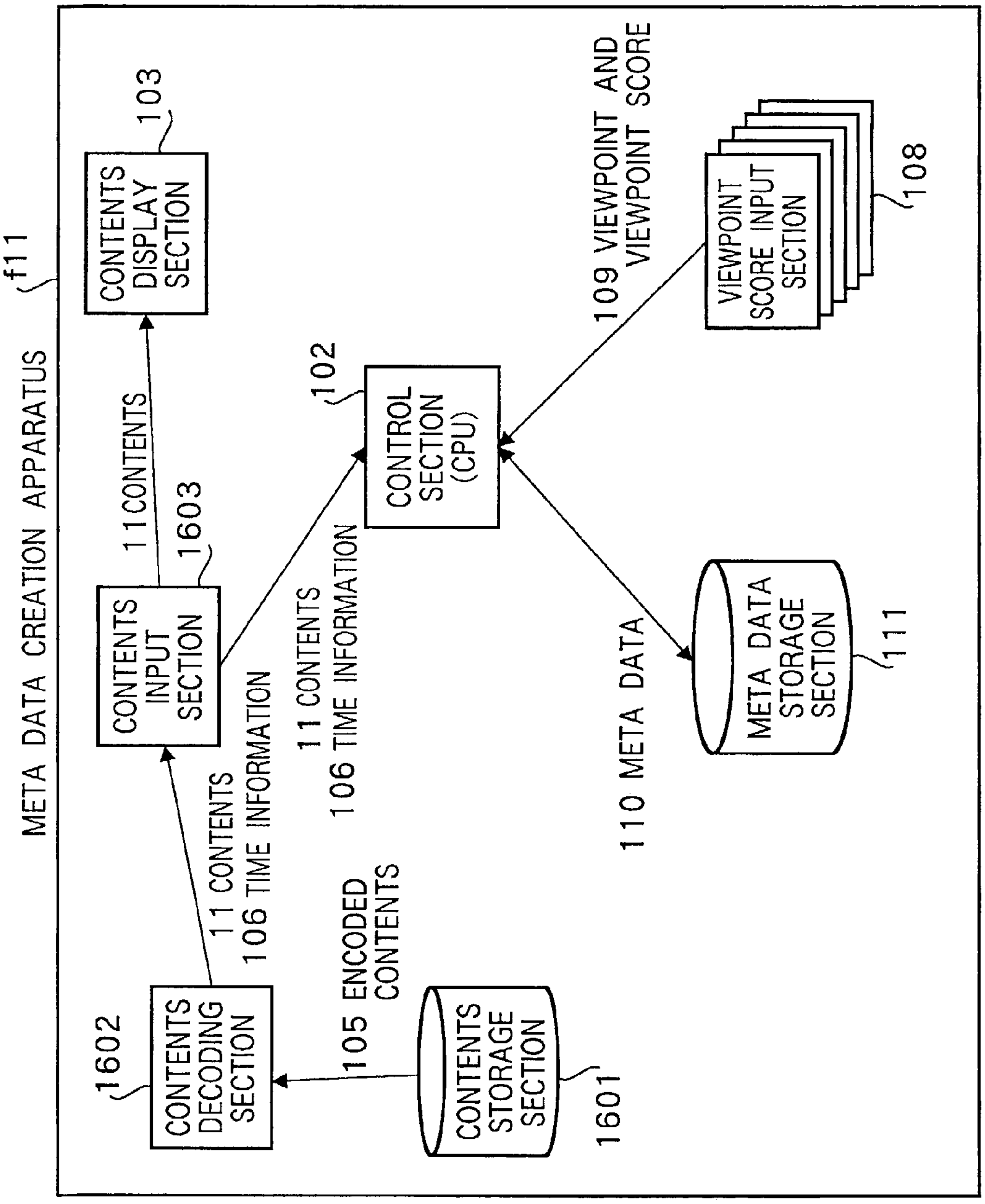
FIG. 16 is a block diagram showing a configuration of a meta data creation apparatus according to Embodiment 5 of the present invention.

FIG. 16 is a block diagram showing a configuration of the meta data creation apparatus according to Embodiment 5. In FIG. 16, the same components as those in FIG. 1 are assigned the same reference numerals and explanations thereof will be omitted.

Meta data creation apparatus f11 according to Embodiment 5 is provided with contents storage section 1601 that stores encoded contents 105 which is encoded in a format such as MPEG. Contents storage section 1601 may be a storage section built in an apparatus such as a hard disk or an external storage medium such as DVD or video. When a storage section such as a hard disk is adopted as contents storage section 1601, it is possible to adopt a mode in which encoded contents are downloaded to contents storage section 1601 via a network.

Furthermore, meta data creation apparatus f11 is provided with contents decoding section 1602 that decodes encoded contents 105 output from contents storage section 1601 and creates contents 11 and time information 106. Furthermore, contents 11 and time information 106 output from contents decoding section 1602 are input to contents input section 1603.

Contents input section 1603 outputs contents 11 to contents display section 103 and outputs contents 11 and time information 106 to control section 102.

Figure 17:
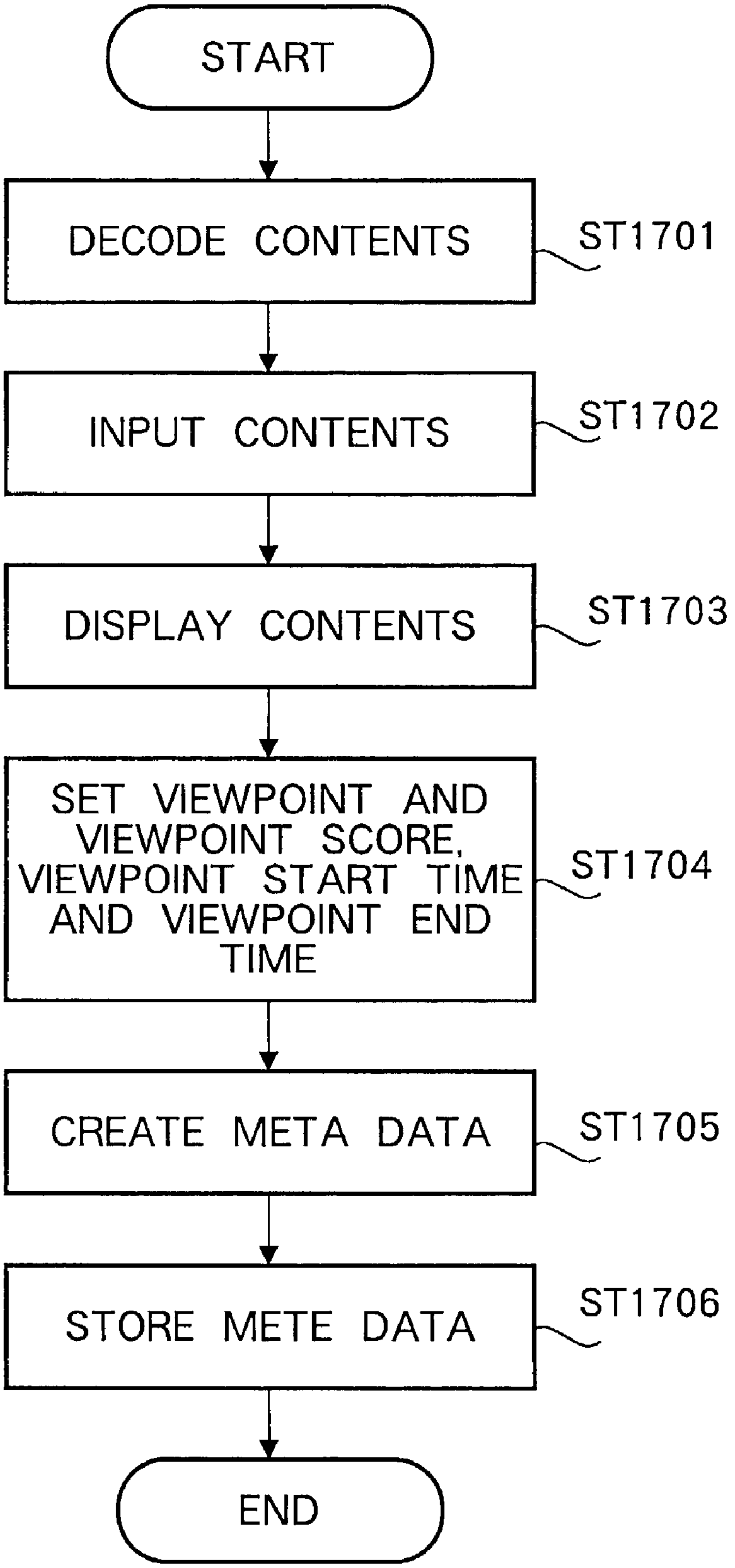
FIG. 17 is a flow chart of a meta data creation operation of the meta data creation apparatus according to Embodiment 5.

Then, a meta data creation operation of meta data creation apparatus f11 according to Embodiment 5 will be explained using FIG. 17. FIG. 17 is a flow chart of a meta data creation operation of the meta data creation apparatus according to Embodiment 5.

First, encoded contents 105 stored in contents storage section 1601 are decoded by contents decoding section 1602 and contents 11 and time information 106 are created (ST1701). Then, contents input section 1603 captures contents 11 and time information 106 decoded by contents decoding section 1602 (ST1702). Then, contents display section 103 displays contents 11 output from contents input section 1603 (ST1703).

Then, control section 102 sets a viewpoint and viewpoint score, a viewpoint start time and a viewpoint end time from the key input from viewpoint score input section 108 (ST1704). The processing carried out by control section 102 in ST1704 is any one of the processes in ST805 to ST812 shown in FIG. 8, the processes in ST1006 to ST1021 shown in FIG. 10, the processes in ST1306 to ST1313 shown in FIG. 13 or the processes in ST1505 to ST1512 shown in FIG. 15.

Then, control section 102 uses the viewpoint and viewpoint score, viewpoint start time and viewpoint end time set in ST1705 to create viewpoint meta data (ST1705). Then, control section 102 stores the created meta data in meta data storage section 111 (ST1706).

As shown above, Embodiment 5 can decode pre-encoded contents and create time information, and can thereby create meta data that matches sensibilities of the author in real time for the encoded contents, too. Embodiment 5 also allows the meta data author to create viewpoint meta data while monitoring the decoded contents and thereby create meta data that matches sensibilities of the meta data author in real time.

Embodiment 5 has been described as a mode in which contents decoding section 1602 is provided to decode contents, but Embodiment 5 can also adopt a mode in which control section 102 decodes contents.

Furthermore, Embodiment 5 has been described as a mode in which control section 102 has the function as a meta data creation section, but the meta data creation section can also be constructed by dedicated hardware.

Furthermore, the meta data creation section can also be implemented by a general PC. In this case, a processing program executed by control section 102 and contents decoding section 1602 is stored in a recording medium and control section 102 downloads and executes the processing program.

Furthermore, Embodiment 5 has been described as a mode in which encoded contents having time information are stored in contents storage section 1601 beforehand, but Embodiment 5 can also adopt a mode in which encoded contents having time information are input from outside.

Embodiment 6

A meta data creation apparatus according to Embodiment 6 allows the author to input a viewpoint and viewpoint score while checking them and allows the author to check and change the viewpoint and viewpoint score input.

Figure 18:
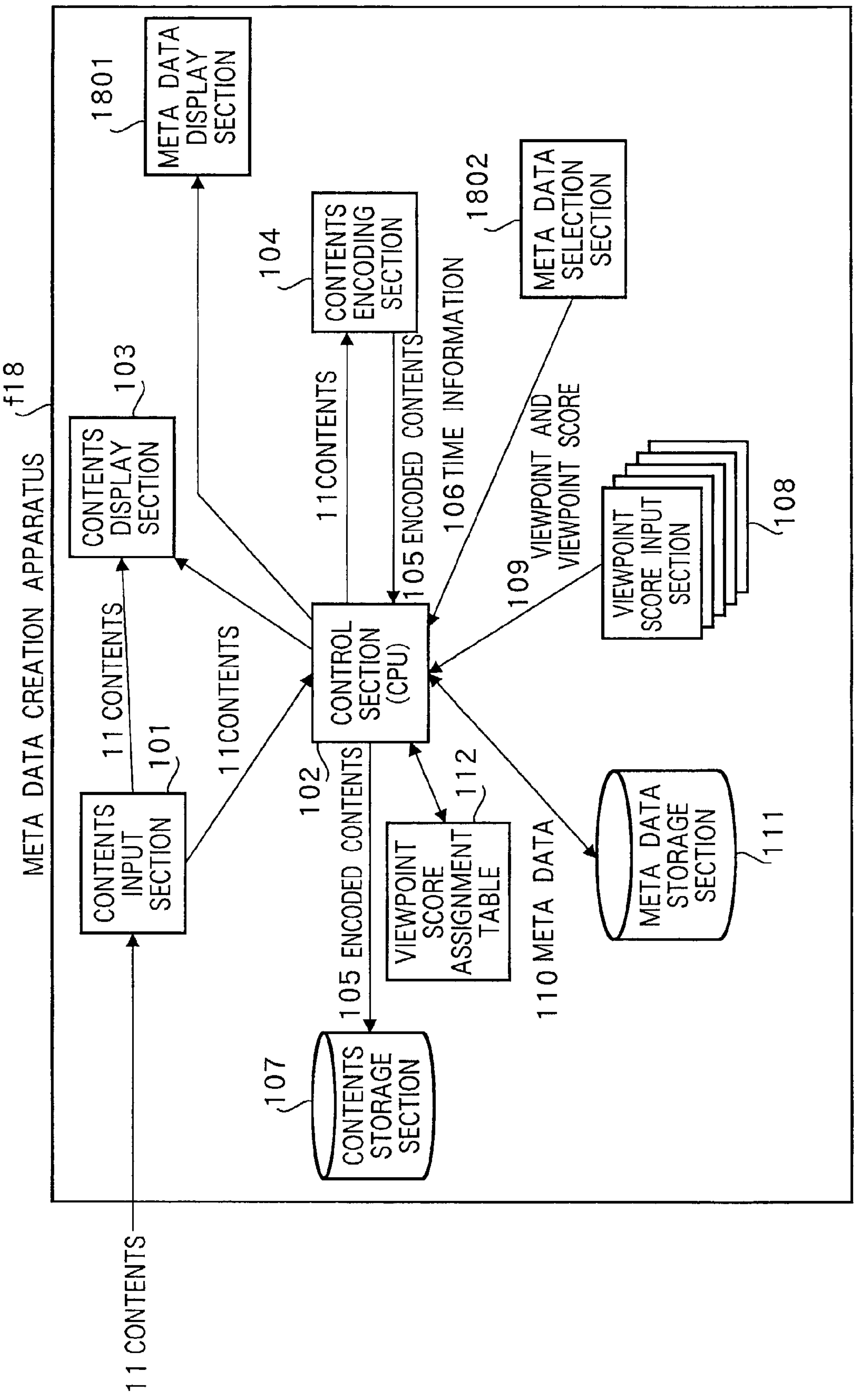
FIG. 18 is a block diagram showing a configuration of a meta data creation apparatus according to Embodiment 6 of the present invention.

A configuration of the meta data creation apparatus according to Embodiment 6 will be explained using FIG. 18. FIG. 18 is a block diagram showing a configuration of the meta data creation apparatus according to Embodiment 6. The same components as those already explained are assigned the same reference numerals and explanations thereof will be omitted.

Meta data creation apparatus f18 according to Embodiment 6 is provided with meta data display section 1801 that displays a viewpoint and viewpoint score input from view score input section 108. Meta data display section 1801 can also display the content of viewpoint score assignment table 112.

Furthermore, meta data creation apparatus f18 is provided with meta data selection section 1802 to select a viewpoint and viewpoint score to be displayed on meta data display section 1801. Meta data selection section 1802 is also used to select whether the viewpoint and viewpoint score input to meta data display section 1801 is displayed in real time or a list of already input viewpoints and viewpoint scores is displayed. Furthermore, when the list of input viewpoints and viewpoint scores is displayed on meta data display section 1801, meta data selection section 1802 can also be used to select individual viewpoints and viewpoint scores from the displayed list. Furthermore, meta data selection section 1802 is a general input device such as a mouse and keyboard.

Furthermore, control section (CPU) 102 reads a viewpoint and a viewpoint score used for the viewpoint from meta data storage section 111 according to the input from meta data selection section 1802. Furthermore, control section 102 also reads information on the correspondence between viewpoints and viewpoint scores and keys from viewpoint score assignment table 112.

Figure 19:
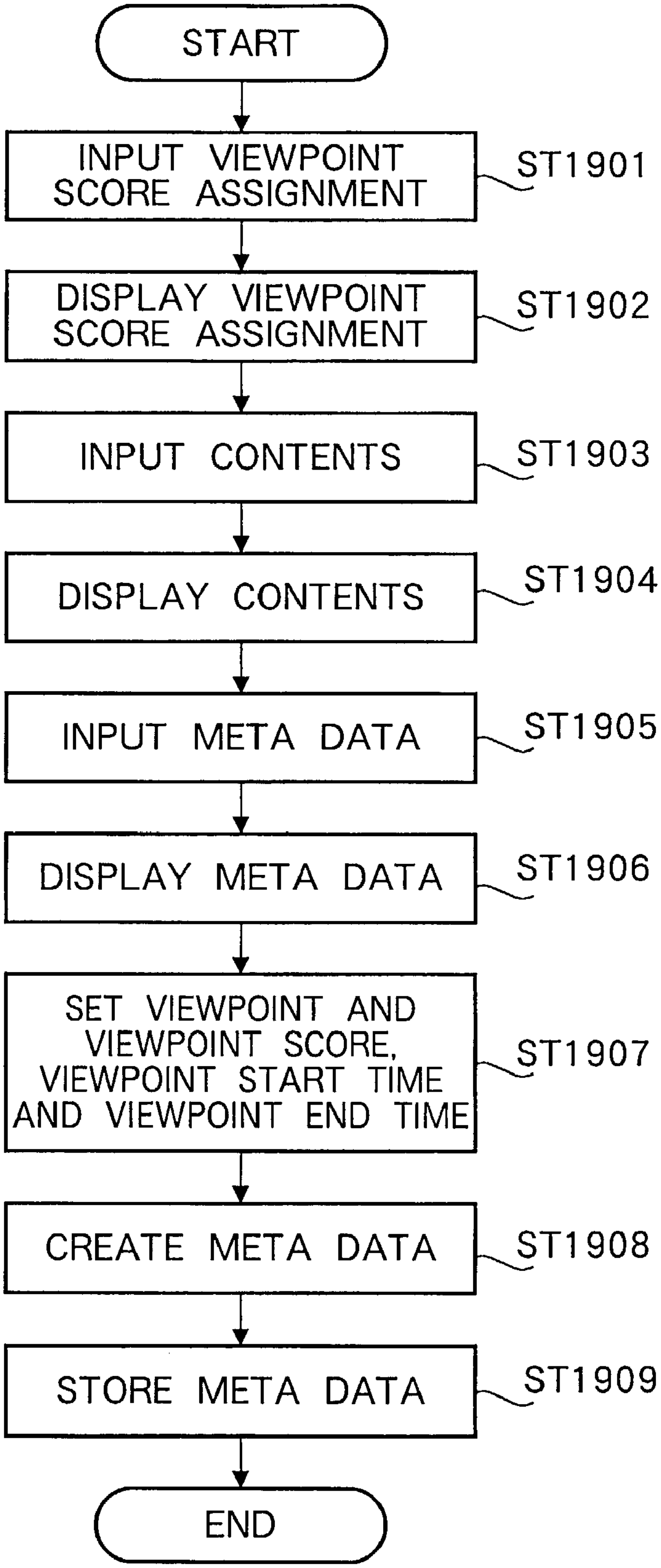
FIG. 19 is a flow chart of a meta data creation operation of a meta data creation apparatus according to Embodiment 7.

Then, an operation of meta data creation apparatus f18 will be explained using FIG. 19. FIG. 19 is a flowchart of a meta data creation operation of the meta data creation apparatus according to Embodiment 7.

First, control section 102 references viewpoint score assignment table 112 and reads viewpoint score assignment information (ST1901). Then, control section 102 sends the viewpoint score assignment information read to meta data display section 1801. Then, meta data display section 1801 displays the viewpoint score assignment information sent (ST1902).

This allows the author to keep track of the assignment of keys and viewpoints and viewpoint scores of viewpoint score input section 108.

Then, contents input section 101 inputs contents 11 (ST1903) and displays contents 11 on contents display section 103 (ST1904).

Then, control section 102 receives the viewpoint and viewpoint score input from viewpoint score input section 108 by the author who saw the viewpoint score assignment and contents described above (ST1905) and sends this viewpoint and viewpoint score received to meta data display section 1801. Then, meta data display section 1801 displays the viewpoint and viewpoint score sent (ST1906).

Thus, the author can check the viewpoint and viewpoint score input by the author himself/herself in real time.

Then, when there is any key input from viewpoint score input section 108 for confirming the content of the viewpoint and viewpoint score, control section 102 sets the viewpoint and viewpoint score, viewpoint start time and viewpoint end time (ST1907). The processing carried out by control section 102 in ST1907 is any one of the processes in ST805 to ST812 shown in FIG. 8, processes in ST1006 to ST1021 shown in FIG. 10, processes in ST1306 to ST1313 shown in FIG. 13 or processes in ST1505 to ST1512 shown in FIG. 15.

Then, control section 102 uses the viewpoint and viewpoint score, viewpoint start time and viewpoint end time set in ST1907 to create viewpoint meta data (ST1908). Then, control section 102 stores the created meta data in meta data storage section 111 (ST1909).

Thus, since it is possible for the author to input a viewpoint and viewpoint score while checking the viewpoint and viewpoint score input, the viewpoint and viewpoint score are input accurately with respect to the contents. This allows meta data to be created accurately with respect to the contents.

By the way, there can be cases where the author inputs wrong viewpoint and viewpoint score or the author wants to change the viewpoint and viewpoint score input. Thus, meta data creation apparatus f18 in Embodiment 6 is also provided with a function of editing a viewpoint and viewpoint score (meta data) input.

Figure 20:
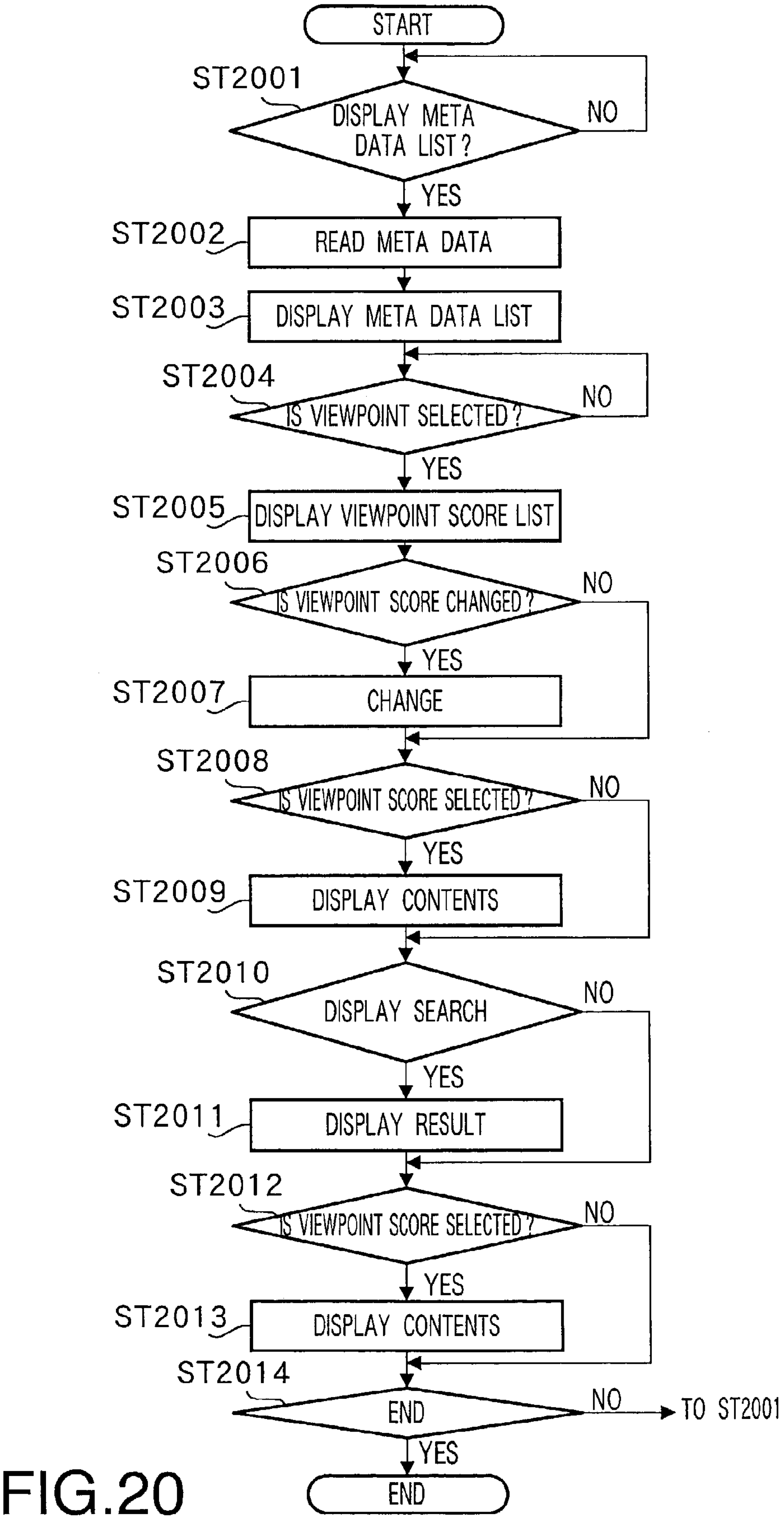
FIG. 20 is a flow chart of a meta data editing operation of the meta data creation apparatus according to Embodiment 6.

Then, a meta data editing operation of the meta data creation apparatus according to Embodiment 6 will be explained using FIG. 20. FIG. 20 is a flow chart of a meta data editing operation of the meta data creation apparatus according to Embodiment 6.

Figure 21A:
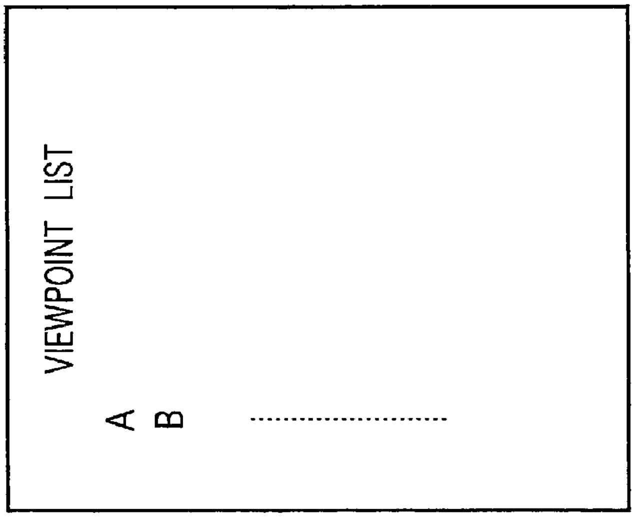
FIG. 21A illustrates a first example of an image displayed on a meta data display section according to Embodiment 6.

Upon receipt of an instruction for displaying a list of meta data from meta data selection section 1802 (ST2001), control section 102 references meta data storage section 111 and reads viewpoints that had new entries (ST2002). Then, control section 102 creates a list of viewpoints read and displays the list on meta data display section 1801 shown in FIG. 21A (ST2003). This allows the author to recognize the viewpoints used.

Figure 21B:
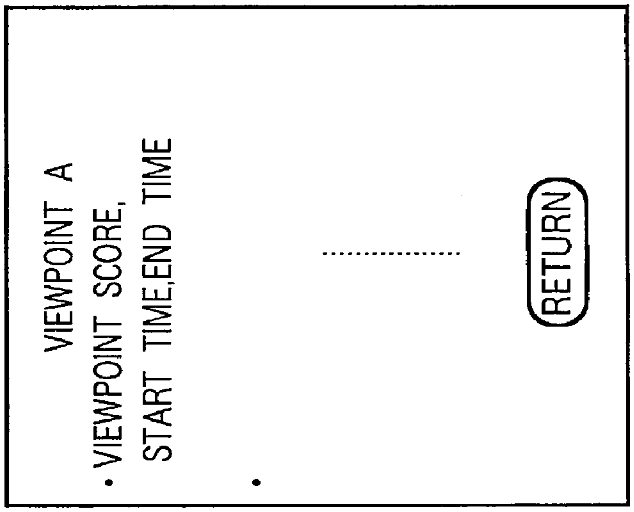
FIG. 21B illustrates a second example of an image displayed on the meta data display section according to Embodiment 6.

Then, upon receipt of an input for selecting a viewpoint from meta data selection section 1802 (ST2004), control section 102 displays a list of viewpoint scores, viewpoint start times and viewpoint end times related to the selected viewpoint on meta data display section 1801 (ST2005). FIG. 21B shows a viewpoint score list displayed at this time. As is seen from this figure, a list of viewpoint scores, viewpoint start times and viewpoint end times with respect to the viewpoint is displayed. Furthermore, viewpoint scores are displayed sorted in the order of viewpoint start times.

This allows the author to recognize a list of viewpoint scores for each viewpoint and perform editing such as changing viewpoint scores.

Then, upon receipt of instructions of selecting a viewpoint score and changing the viewpoint from meta data selection section 1802 (ST2006), control section 102 displays a screen for changing the viewpoint score on meta data display section 1801. Then, upon receipt of a key input from viewpoint score 108, control section 102 changes the selected viewpoint score to a viewpoint score indicated by the key input (ST2007).

Furthermore, upon receipt of instructions selecting a viewpoint score and displaying contents corresponding to the viewpoint score from meta data selection section 1802 (ST2008), control section 102 reads the contents corresponding to the viewpoint score selected from contents storage section 107 and sends the contents to contents display section 103. Then, contents display section 103 displays these contents (ST2009).

Thus, the author can keep track of the length of contents with respect to the viewpoint score by reproducing the contents corresponding to the viewpoint score. This also allows the author to appropriately change the viewpoint start time and viewpoint end time. To change the viewpoint start time and viewpoint end time, meta data selection section 1802 selects a viewpoint score and time information is input from viewpoint score input section 108 as in the case of the process in ST2007.

Figure 21C:
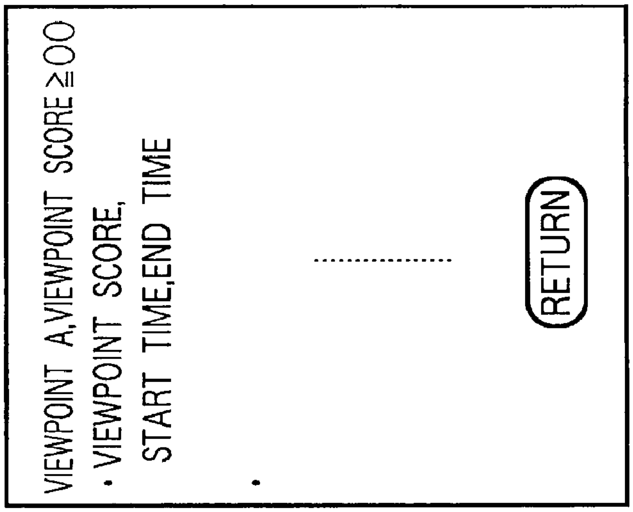
FIG. 21C illustrates a third example of an image displayed on the meta data display section according to Embodiment 6.

Then, upon receipt of an instruction of extracting a viewpoint score from meta data selection section 1802 (ST2010), control section 102 references meta data storage section 111 and extracts meta data having the viewpoint score corresponding to the search condition. Then, control section 102 displays the list of the extracted meta data on meta data display section 1801 (ST2011). FIG. 21C displays the image displayed on meta data display section 1801 at this time. In this example, the search condition is a condition that the viewpoint score is equal to or greater than ○○.

This allows the author to recognize the distribution of the viewpoint score input. This makes it possible to reassign the viewpoint score so as to be distributed appropriately.

Then, upon receipt of an instruction of selecting a viewpoint score and displaying the contents corresponding to the viewpoint score from meta data selection section 1802 (ST2012), control section 102 reads the contents corresponding to the viewpoint score selected from contents storage section 107 and sends it to contents display section 103. Then, contents display section 103 displays these contents (ST2013).

The above processes ST2001 to ST2013 are repeated until the meta data editing operation is finished (ST2014)

As explained above, Embodiment 6 allows the author to display a viewpoint and viewpoint score of stored meta data, select and edit an arbitrary viewpoint and viewpoint score and thereby edit the viewpoint and viewpoint score easily. Furthermore, the author can accurately keep track of the situation of the meta data input by referencing the list of the viewpoints and viewpoint scores of the meta data displayed on meta data display section 1801. As a result, the author can edit meta data accurately. Furthermore, since the list of the viewpoints and viewpoint scores of the meta data is displayed in the order of time information, the author can check viewpoints and viewpoint scores in a one-to-one correspondence with the time information.

By the way, meta data display section 1801 and meta data selection section 1802 according to Embodiment 6 can also be used in combination with Embodiment 2.

Furthermore, Embodiment 6 has described contents display section 103 and meta data display section 1801, and viewpoint score input section 108 and meta data selection section 1802 as separate configurations, but contents display section 103 and meta data display section 1801, and viewpoint score input section 108 may also be integrated into a same configuration.

Furthermore, Embodiment 6 has been described as a mode in which contents encoding section 104 is provided to encode contents, but Embodiment 6 can also be implemented in a mode in which control section 102 encodes contents.

Furthermore, Embodiment 6 has been described as a mode in which control section 102 has a function as a meta data creation section and meta data editing section, but the meta data creation section and meta data editing section can also be constructed by dedicated hardware.

Furthermore, the meta data creation apparatus may also be implemented by a general PC. In this case, a processing program executed by control section 102 and contents encoding section 104 is stored in a recording medium and control section 102 downloads and executes the processing program.

Embodiment 7

Embodiment 7 separates the section of inputting a viewpoint and viewpoint score from the meta data creation apparatus as a meta data input terminal. Then, the meta data creation apparatus and meta data input terminal are connected via a network. Thus, by carrying only the meta data input terminal, the author can arbitrarily input a viewpoint and viewpoint score from the meta data input terminal to the contents that vary with time. Then, the author can send the meta data of the viewpoint and viewpoint score input to the meta data creation apparatus via a network and the meta data creation apparatus can create meta data on this viewpoint and viewpoint score.

However, simply separating the meta data creation apparatus and meta data input apparatus and providing them with an information transmission section and information reception section respectively may result in a discrepancy in time information between the meta data creation apparatus and meta data input terminal. For this reason, there is a problem that the author cannot associate the timing at which the viewpoint and viewpoint score are input with time information of contents.

Thus, Embodiment 7 contrives to synchronize time information between the meta data creation apparatus and meta data input apparatus.

Figure 22:
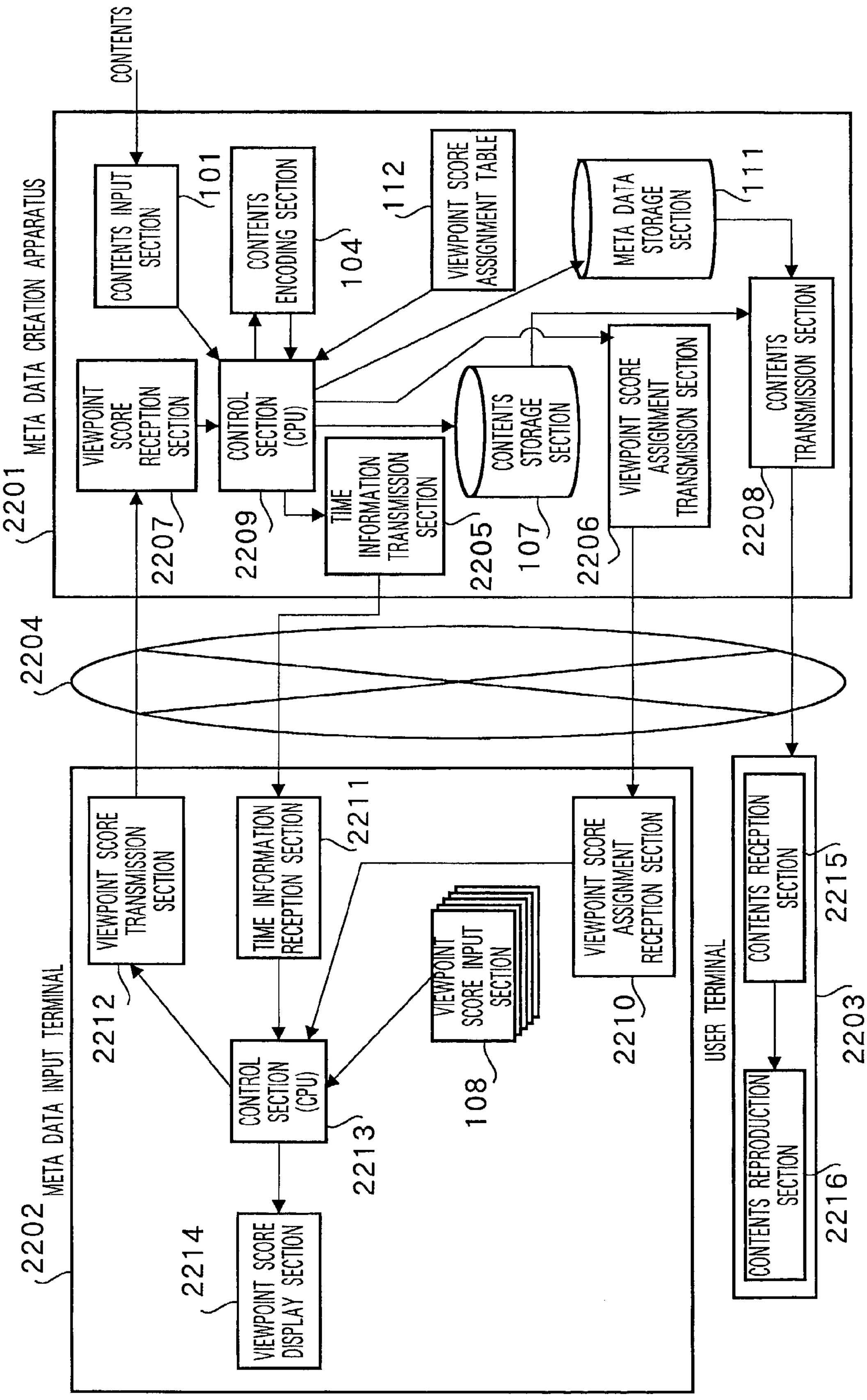
FIG. 22 is a block diagram showing a configuration of a meta data creation system according to Embodiment 7 of the present invention.

A configuration of the meta data creation apparatus according to Embodiment 7 will be explained using FIG. 22. FIG. 22 is a block diagram showing a configuration of the meta data creation apparatus according to Embodiment 7.

The components already explained are assigned the same reference numerals and explanations thereof will be omitted.

As is seen from FIG. 22, the meta data creation system according to Embodiment 7 adopts a configuration with meta data creation apparatus 2201, meta data input terminal 2202 and user terminal 2203 having a contents reception section connected via a network 2204.

As the network 2204, a general network such as a public telephone circuit, Internet, LAN or cellular telephone network can be used.

Meta data creation apparatus 2201 is provided with contents input section 101, contents encoding section 104, viewpoint score assignment table 112, contents storage section 107 and meta data storage section 111. Furthermore, meta data creation apparatus 2201 is also provided with time information transmission section 2205, viewpoint score assignment transmission section 2206, viewpoint score assignment reception section 2207 and contents transmission section 2208 as an information transmission section and information reception section.

Time information transmission section 2205 is an information transmission section for sending the time information generated by contents encoding section 104 to other devices such as meta data input terminal 2202 via network 2204. Furthermore, viewpoint score assignment transmission section 2206 is an information transmission section for sending the content stored in viewpoint score assignment table 112 to other devices such as meta data input terminal 2202 via network 2204. Furthermore, viewpoint score reception section 2207 is an information reception section for receiving the viewpoints and viewpoint scores and viewpoint and viewpoint score input times sent from other devices such as meta data input terminal 2202. Furthermore, contents transmission section 2208 is an information transmission section for sending the contents stored in contents storage section 107 and meta data stored in meta data storage section 111 to other devices such as user terminal 2203.

Time information transmission section 2205, viewpoint score assignment transmission section 2206 and contents transmission section 2208 send information using a protocol according to the mode of network 2204. Furthermore, viewpoint score reception section 2207 receives information using a protocol according to the mode of network 2204.

Furthermore, meta data creation apparatus 2201 is provided with control section (CPU) 2209 as the meta data creation section. Control section 2209 creates viewpoint meta data from the viewpoint and viewpoint score received by viewpoint score reception section 2207 and viewpoint and viewpoint score input time information and stores them in meta data storage section 111. The method for control section 2209 to create meta data from the viewpoint and viewpoint score and the viewpoint and viewpoint score input time information is the same as that of control section 102 which has already been described above.

Furthermore, control section 2209 performs processing of storing the encoded contents generated by contents encoding section 104 in contents storage section 107, the processing of referencing the viewpoint score assignment table 112 and sending the content to viewpoint score assignment transmission section 2206, the processing of referencing contents storage section 107 and meta data storage section 111 and sending contents and the meta data corresponding to the contents to contents transmission section 2208.

On the other hand, meta data input terminal 2202 is provided with viewpoint score input section 108. Furthermore, meta data input terminal 2202 is provided with viewpoint score assignment reception section 2210 and time information reception section 2211 as information reception sections and viewpoint score transmission section 2212 as an information transmission section.

Viewpoint score assignment reception section 2210 receives the viewpoint score assignment sent from meta data creation apparatus 2201. Furthermore, time information reception section 2211 receives the time information sent from meta data creation apparatus 2201. Furthermore, viewpoint score transmission section 2212 sends the viewpoint and viewpoint score input from viewpoint score input section 108 and their input times to meta data creation apparatus 2201.

Furthermore, viewpoint score assignment reception section 2210 and time information reception section 2211 receive information using a protocol according to the mode of network 2204 and viewpoint score transmission section 2212 sends information using a protocol according to the mode of network 2204.

Furthermore, meta data input terminal 2202 is provided with control section (CPU) 2213 as a meta data setting section that sets the viewpoint and viewpoint score input from viewpoint score input section 108 and these viewpoint and viewpoint score input times in association with the time information received by time information reception section 2212. The method for control section 2213 to associate the viewpoint and viewpoint score input from viewpoint score input section 108 with these viewpoint and viewpoint score input times is the same as that of control section 102.

Furthermore, control section 2213 is provided with viewpoint score display section 2214 that displays the viewpoint score assignment received by viewpoint score assignment reception section 2210.

Furthermore, user terminal 2203 is provided with contents reception section 2215 that receives contents and meta data sent from meta data creation apparatus 2201 and contents reproduction section 2216 that reproduces the received contents. Furthermore, contents reproduction section 2216 also generates and displays index information of the contents using the received meta data.

Figure 23:
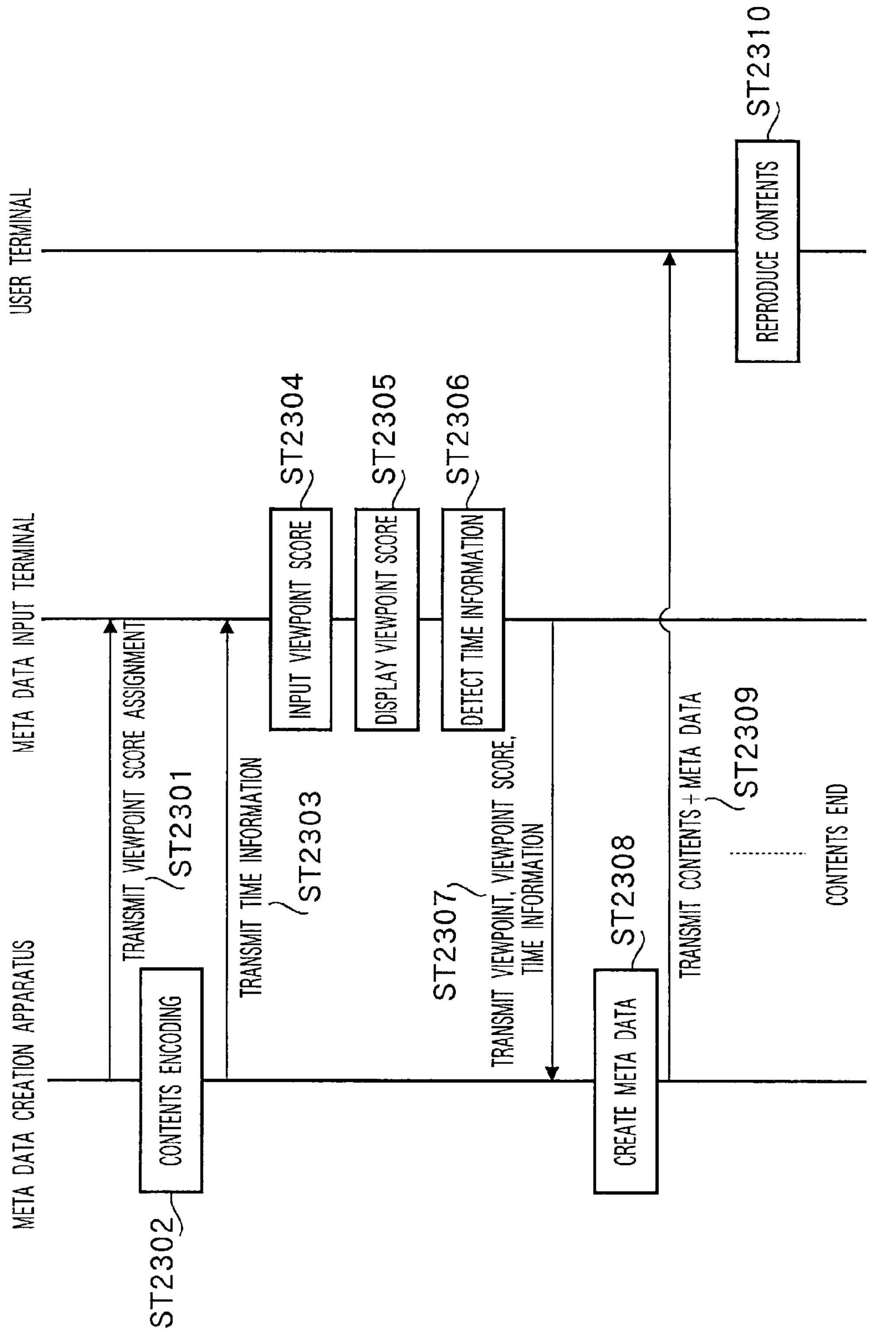
FIG. 23 is an operation sequence diagram of the meta data creation system according to Embodiment 7 of the present invention.

An operation of the meta data creation system according to Embodiment 7 will be explained using FIG. 23 below. FIG. 23 is an operation sequence diagram of the meta data creation system according to Embodiment 7.

First, control section 2209 of meta data creation apparatus 2201 references viewpoint score assignment table 112, extracts viewpoint score assignment and sends it to viewpoint score assignment transmission section 2206. Then, viewpoint score assignment transmission section 2206 sends the viewpoint score assignment sent to meta data input terminal 2202 (ST2301).

Then, meta data creation apparatus 2201 encodes the contents input from contents input section 101 by contents encoding section 104 (ST2302). Together with this, contents encoding section 104 assigns time information to the contents. Then, control section 2209 sends the time information of the contents encoded by contents encoding section 104 to time information transmission section 2205. Then, time information transmission section 2205 sends the time information of the contents sent to meta data input terminal 2202 (ST2303).

On the other hand, when viewpoint score assignment reception section 2210 receives the viewpoint score assignment, meta data input terminal 2202 displays the viewpoint score received on viewpoint score display section 2214. Then, when the author who recognizes the viewpoint score assignment displayed inputs the viewpoint and viewpoint score from viewpoint score input section 108 (ST2304), the viewpoint and viewpoint score input are displayed on viewpoint score display section 2214 so that the author can recognize the information input (ST2305). By the way, any of the methods of Embodiment 1 to Embodiment 4 can be used as the method of the inputting viewpoint and viewpoint score and control section 2213 performs the same processing as that of control section 104 according to the input method.

Then, control section 2213 of meta data input terminal 2202 associates the input time at which the viewpoint and viewpoint score were input from viewpoint score input section 108 with the time information of the contents received by time information reception section 2211 (ST2306).

Then, control section 2213 of meta data input terminal 2202 sends the viewpoint and viewpoint score input and the time information of the contents corresponding to the input time to meta data creation apparatus 2201 through viewpoint score transmission section 2212 (ST2307).

On the other hand, viewpoint score reception section 2207 of meta data creation apparatus 2201 receives the viewpoint and viewpoint score and contents time information sent from meta data input terminal 2202. Then, control section 2209 of meta data creation apparatus 2201 creates meta data from the viewpoint and viewpoint score and contents time information sent (ST2308). By the way, the processing carried out by control section 2209 in ST2308 is any one of the processes in ST805 to ST812 shown in FIG. 8, the processes in ST1006 to ST1021 shown in FIG. 10, the processes in ST1306 to ST1313 shown in FIG. 13 or the processes in ST1505 to ST1512 shown in FIG. 15.

Then, control section 2209 of meta data creation apparatus 2201 stores the meta data created in meta data storage section 111. Upon receipt of a contents distribution request from the user terminal, control section 2209 references contents storage section 107 and meta data storage section 111 and sends the requested contents and meta data corresponding to these contents to user terminal 2203 via contents transmission section 2208 (ST2309). Upon receipt of the contents and meta data whose distribution was requested at contents reception section 2215, user terminal 2203 reproduces the received contents at contents reproduction section 2216 (ST2310). Furthermore, upon receipt of an index information creation instruction using a viewpoint and viewpoint score from the user, contents reproduction section 2216 creates index information.

Then, processes in ST2301 to ST2310 are repeated until the contents are completed.

As described above, Embodiment 7 allows the author to input a viewpoint and viewpoint score from meta data input terminal 2202 to contents (baseball, soccer, concert, etc.) that vary with time and assign the contents time information to the viewpoint and viewpoint score. Furthermore, Embodiment 7 allows the author to send the viewpoint and viewpoint score with the time information assigned to meta data creation apparatus 2201 via network 2204. Then, meta data creation apparatus 2201 receives the viewpoint and viewpoint score with the time information assigned sent via the network and can thereby create meta data of the viewpoint and viewpoint score received.

Furthermore, by providing the server with meta data creation apparatus 2201 and providing the author side with meta data input terminal 2202, Embodiment 7 can reduce the size of the apparatus on the author side. Furthermore, by reducing the size of meta data input terminal 2202, Embodiment 7 allows a plurality of authors to have meta data input terminal 2202 and input viewpoints and viewpoint scores while checking common contents. For example, there can be a mode in which meta data input terminal 2202 is set on a plurality of spectators' stands in a soccer stadium, a plurality of authors who watches the game inputs viewpoints and viewpoint scores about the game and these viewpoints and viewpoint scores input are sent to the meta data creation apparatus set in the soccer stadium. This makes it possible to create meta data in real time based on sensibilities of people watching the game. Furthermore, it is also possible to send the meta data created in this way to general households simultaneously with contents of the game in real time.

By the way, Embodiment 7 has been described as a mode in which the author watches the information that varies with time and inputs an arbitrary viewpoint and viewpoint score to the information, but it is also possible to adopt a mode in which the meta data input terminal includes contents input section 101 and contents display section 103.

It is also possible to adopt a mode in which meta data input terminal 2202 includes contents encoding section 104 and meta data input terminal 2202 associates the time information generated by contents encoding section 104 with the viewpoint and viewpoint score input. In this case, meta data creation apparatus 2201 need not send contents time information to meta data input terminal 2202, and therefore there is no need to include time information transmission 2205 and time information reception section 2211.

By the way, Embodiment 7 may also adopt a mode in which the processing carried out by control sections 2209 and 2213 is implemented as a program stored, downloaded and executed by control sections 2209 and 2213 or the processing carried out by control sections 2209 and 2213 is implemented by dedicated hardware.

Furthermore, Embodiment 7 has been described as a mode including time information transmission section 2205, viewpoint score assignment transmission section 2206, viewpoint score reception section 2207 and contents transmission section 2208, but it is also possible to integrate time information transmission section 2205, viewpoint score assignment transmission section 2206, and contents transmission section 2208 into a same configuration as an information transmission section. Or it is also possible to integrate time information transmission section 2205, viewpoint score assignment transmission section 2206, viewpoint score reception section 2207 and contents transmission section 2208 into a same configuration as an information transmission/reception section. Furthermore, it is also possible to integrate viewpoint score assignment reception section 2210 and viewpoint score transmission section 2212 into a same information transmission/reception section.

Embodiment 8

Embodiment 8 uses an absolute time such as world standard time as contents time information so that the meta data creation apparatus need not send time information to the meta data input terminal. This is because using an absolute time as the contents time information allows the meta data creation apparatus and meta data input terminal to have common time information and thereby accurately associate the viewpoint and viewpoint score input times with the contents input information. In contrast, according to Embodiment 7, in order for the meta data creation apparatus and meta data input terminal to have common time information, the contents time information needs to be sent from the meta data creation apparatus to the meta data input apparatus.

Figure 24:
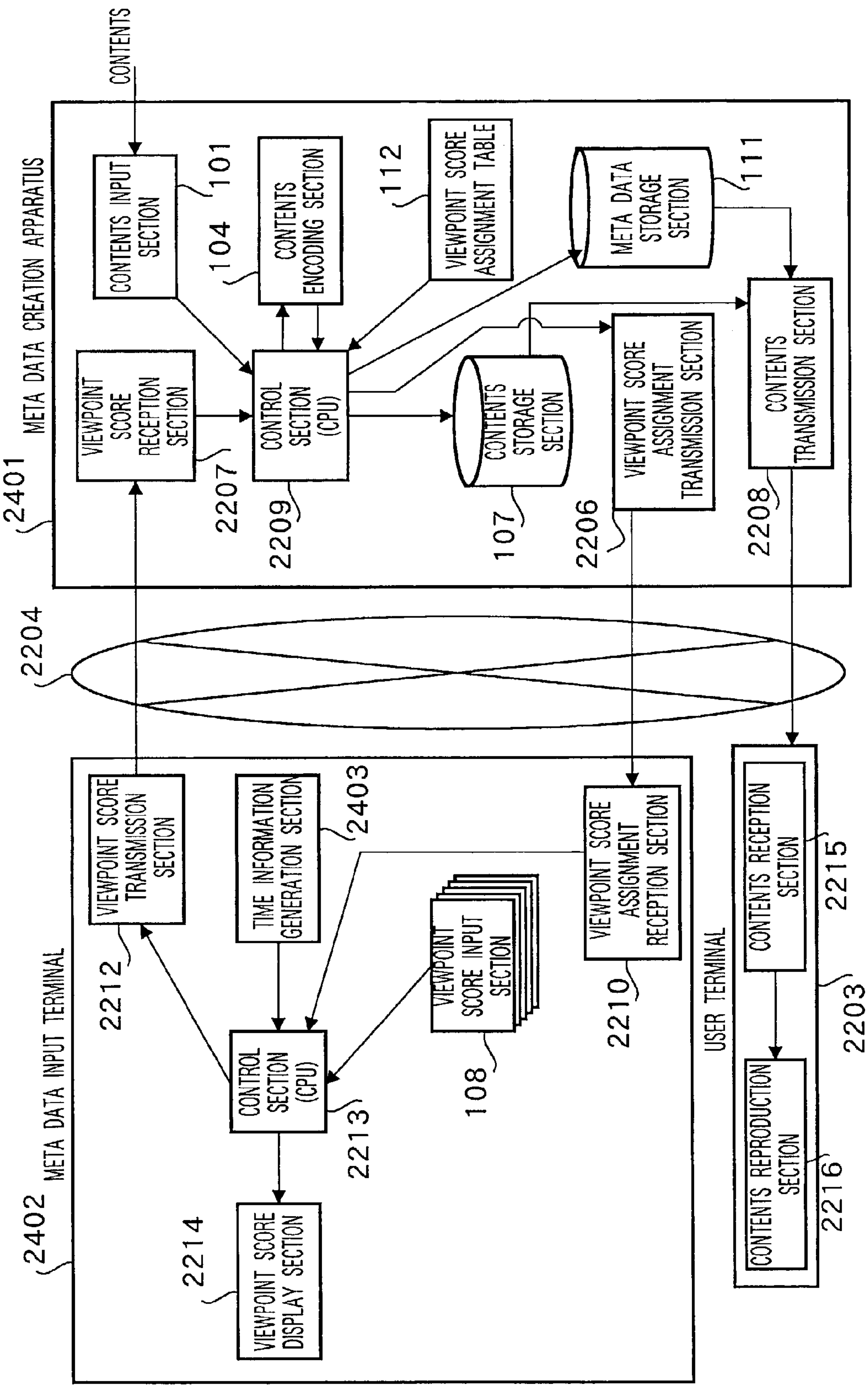
FIG. 24 is a block diagram showing a configuration of a meta data creation system according to Embodiment 8 of the present invention.

A meta data creation system according to Embodiment 8 will be explained using FIG. 24. FIG. 24 is a block diagram showing a configuration of a meta data creation system according to Embodiment 8. By the way, the same components that have already been explained are assigned the same reference numerals and explanations thereof will be omitted.

Meta data creation apparatus 2401 according to Embodiment 8 does not include time information transmission section 2205 of meta data creation apparatus 2201 of Embodiment 7. Furthermore, meta data input terminal 2402 of Embodiment 8 does not include time information reception section 2211 of meta data input terminal 2202 of Embodiment 7, but is provided with time information generation section 2403 that generates an absolute time instead. Furthermore, contents encoding section 104 in Embodiment 8 uses an absolute time as contents time information.

The operation of the meta data creation system according to Embodiment 8 after input of a viewpoint and viewpoint score until creation of meta data will be explained.

First, when there is an input from viewpoint score input section 108, control section 2213 associates the input time of the viewpoint and viewpoint score input from viewpoint score input section 108 with an absolute time generated by time information generation section 2403. Then, control section 2213 sends the viewpoint and viewpoint score input and the absolute time corresponding to the input time of the viewpoint and viewpoint score to meta data creation apparatus 2401 through viewpoint score transmission section 2212.

On the other hand, upon receipt of the viewpoint and viewpoint score input and the absolute time corresponding to the input time of the viewpoint and viewpoint score, meta data creation apparatus 2401 uses the viewpoint and viewpoint score and the absolute time corresponding to the input time received at control section 2209 as a viewpoint start time or viewpoint end time to create the viewpoint meta data as shown in FIG. 3.

Here, both the start time and end time of the meta data of the created viewpoint and the time information generated by contents encoding section 104 are absolute times. That is, the start time and end time are consistent with the time information generated by contents encoding section 104.

As explained above, by associating the input time of the viewpoint and viewpoint score with the absolute time, Embodiment 8 allows all terminals to recognize the input time of the viewpoint and viewpoint score. This makes it possible to associate the input time of the viewpoint and viewpoint score with the time information of the contents even if meta data creation apparatus 2401 does not send the contents time information to meta data input terminal 2402. This makes it possible to reduce the amount of information to be sent from meta data creation apparatus 2401 to meta data input terminal 2402.

Embodiment 8 has been described as a mode in which an absolute time is used as contents time information, but it is also possible to use time information predetermined between meta data creation apparatus 2201 and meta data input terminal 2202. For example, time information can also be expressed with a relative time from a time at some characteristic point. In this case, meta data creation apparatus 2401 and meta data input terminal need to have sections to recognize the same characteristic points. As a time of this characteristic point, a start time, etc. may be used in the case where contents are a sports match or play.

Furthermore, it is also possible to adopt a mode in which time information generation section 2403 is provided in an outside terminal, not in meta data input terminal 2402 and time information is input from the external terminal.

Embodiment 9

A meta data creation system according to Embodiment 9 is provided with a meta data editing apparatus that edits a viewpoint and viewpoint score output from a plurality of the meta data input terminals according to Embodiment 8.

Figure 25:
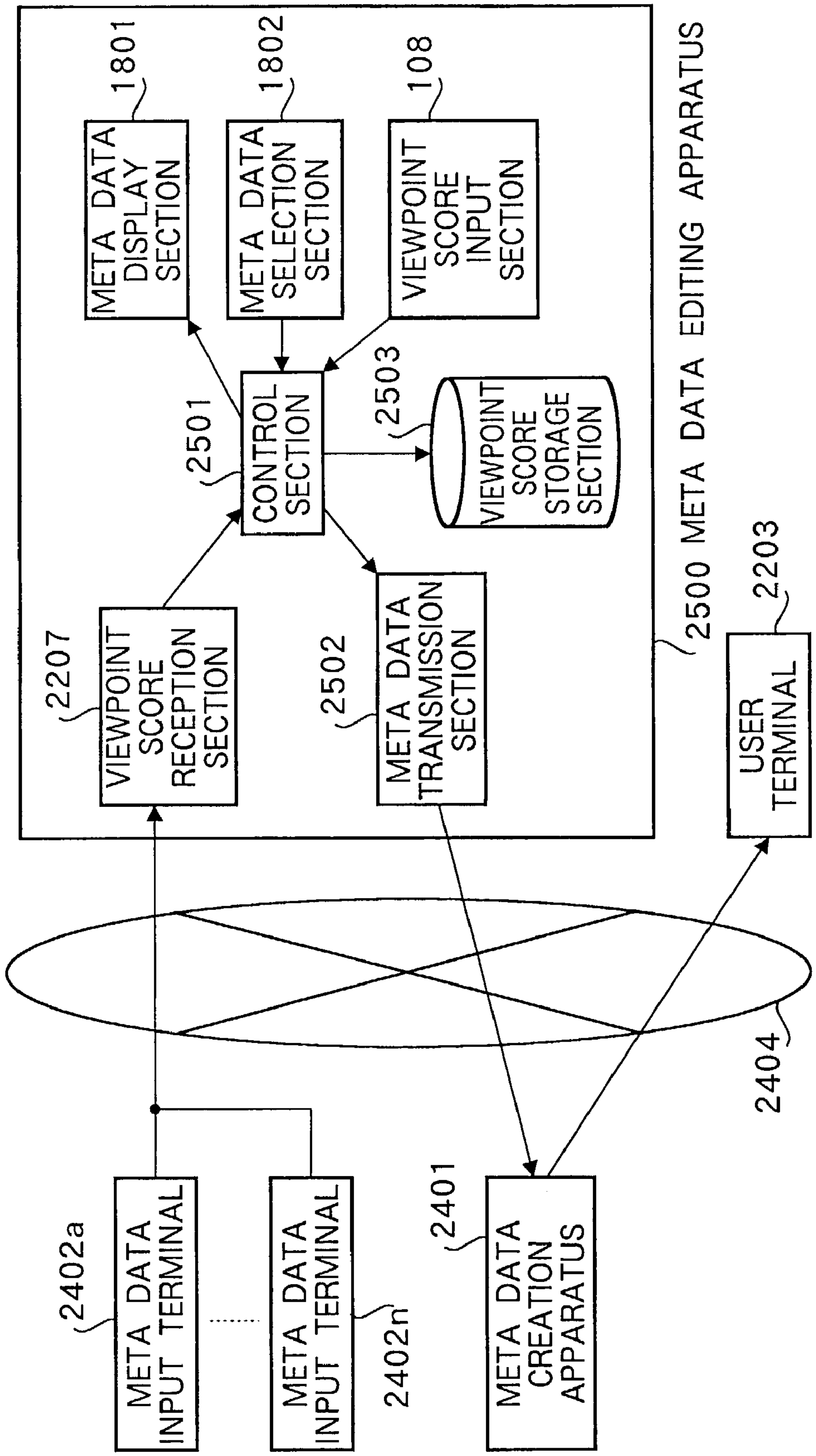
FIG. 25 is a block diagram showing a configuration of a meta data creation system according to Embodiment 9 of the present invention.

A configuration of the meta data creation system according to Embodiment 9 will be explained using FIG. 25. FIG. 25 is a block diagram showing a configuration of a meta data creation system according to Embodiment 9. The same components as those already explained are assigned the same reference numerals and explanations thereof will be omitted.

As is seen from FIG. 25, the meta data creation system according to Embodiment 9 is constructed of a plurality of meta data input terminals **2402*a* to 2402*n*, meta data editing apparatus 2500, meta data creation apparatus 2401 and user terminal 2203 connected via network 2204**.

Meta data input terminal **2402*a* to 2402*n*** output a viewpoint and viewpoint score input and time information corresponding to the input time of the viewpoint and viewpoint score input.

Meta data editing apparatus 2500 is provided with viewpoint score reception section 2207 that receives the viewpoint and viewpoint score output from meta data input terminals **2402*a* to 2402*n*** and time information corresponding to the input time of the viewpoint and viewpoint score.

Furthermore, meta data editing apparatus 2500 is provided with viewpoint score storage section 2503 that stores the viewpoint and viewpoint score received by viewpoint score reception section 2207 and viewpoint time information. Meta data editing apparatus 2500 is also provided with meta data selection section 1802 that selects the viewpoint and viewpoint score stored in viewpoint score storage section 2503 and viewpoint time information. Meta data editing apparatus 2500 is also provided with meta data display section 1801 that displays a list of viewpoints and viewpoint scores stored in viewpoint score storage section 2503 according to an instruction from meta data selection section 1802.

Meta data editing apparatus 2500 is further provided with control section 2501 that arranges a plurality of viewpoints and viewpoint scores and viewpoint time information received by viewpoint score reception section 2207 for every time information piece and stores in viewpoint score storage section 2503. Furthermore, control section 2501 is also provided with the function as a meta data editing section that edits the plurality of viewpoints and viewpoint scores and viewpoint time information received by viewpoint score reception section 2207. Control section 2501 performs editing such as averaging viewpoints and viewpoint scores having same time information and detecting the most numerous viewpoints and viewpoint scores. Then, control section 2501 sends the viewpoints and viewpoint scores and viewpoint time information edited to meta data creation apparatus 2401 through meta data transmission section 2502.

Then, meta data creation apparatus 2401 creates meta data based on the edited viewpoints and viewpoint scores and viewpoint time information sent.

Furthermore, meta data editing apparatus 2500 is also provided with a function of editing the plurality of viewpoints and viewpoint scores received by viewpoint score reception section 2207 using an input from the author in addition to automatically editing them at control section 2501.

More specifically, the author displays a list of the viewpoints and viewpoint scores received by viewpoint score reception section 2207 arranged in the time information sequence on meta data display section 1801. Then, the author selects a time to be edited from the viewpoint list displayed using meta data selection section 1802. Then, the author inputs a desired viewpoint and viewpoint score from viewpoint score input section 108 for the selected time information.

As shown above, when the meta data creation system is provided with the plurality of meta data input terminals 2402*a* to 2402*n* and even if the plurality of meta data input terminals 2402*a* to 2402*n* input different viewpoints and viewpoint scores for the same time information, Embodiment 9 can edit different viewpoints and viewpoint scores and output them to meta data creation apparatus 2401. Then, Embodiment 9 can create meta data using the edited viewpoints and viewpoint scores received by meta data creation apparatus 2401. Thus, the meta data creation system can be provided with a plurality of meta data input terminals 2402*a* to 2402*n*. As a result, it is possible to realize a meta data creation system capable of receiving inputs of viewpoints and viewpoint scores from a plurality of authors.

Embodiment 9 has been described as a mode in which meta input terminal 2402 and meta data creation apparatus 2401 according to Embodiment 8 have been used, but it is also possible to adopt a mode in which meta data input terminal 2302 and meta data creation apparatus 2201 according to Embodiment 7 are used. In this case, it is necessary to send contents time information from meta data creation apparatus 2201 to meta data input terminal 2201.

Furthermore, Embodiment 9 has described meta data editing apparatus 2500 as an independent apparatus, but it is also possible to adopt a mode in which meta data editing apparatus 2500 is included in meta data creation apparatus 2401.

This application is based on the Japanese Patent Application No. 2001-121484 filed on Apr. 19, 2001, entire content of which is expressly incorporated by reference herein.

INDUSTRIAL APPLICABILITY

As described above, the present invention can input a viewpoint and viewpoint score while monitoring contents and create meta data with the viewpoint input time associated with the contents time information, making it possible to create meta data that matches sensibilities of the meta data author in real time.

What is claimed is:

1. A meta data creation apparatus comprising:

a contents input section configured to receive contents as input, a display configured to display the input contents;

a segmentator configured to divide the input contents into a plurality of segments according to a content of the contents and to assign a start time and an end time for each segment as a second time information with respect to a first time information included in the contents;

a viewpoint score input section configured to receive, as input, a pair of a viewpoint and a viewpoint score by operation of a key, the viewpoint comprising a keyword and being based on the content of the contents to be displayed by the display, and the viewpoint score indicating a degree of importance of the viewpoint; and a viewpoint score assignment table, where the pair of the viewpoint and the viewpoint score is assigned to the key, a meta data creator that determines whether the received pair of the viewpoint and the viewpoint score is received as input in a corresponding segment, and that, when the pair of the viewpoint and the viewpoint score is received as input in the corresponding segment, creates, with reference to the viewpoint score assignment table, meta data assigned to the input pair of the viewpoint and the viewpoint score corresponding to the operated key and the second time information, for the corresponding segment.

2. The meta data creation apparatus according to claim 1, wherein the contents comprises at least one of a medium of moving images, voice, text, three-dimensional images and animation.

3. The meta data creation apparatus according to claim 1, wherein the pair of the viewpoint and the viewpoint score is least one of a viewpoint of MPEG-7 and a user definition.

4. The meta data creation apparatus according to claim 1, wherein the meta data is structurally described.

5. The meta data creation apparatus according to claim 1, wherein, when the key is operated, said meta data creator assigns the input pair of the viewpoint and the viewpoint score, to the segment corresponding to the time shifted by a predetermined time from the time at which the key was operated.

6. The meta data creation apparatus according to claim 1, the meta data creator being configured to assign a last input pair of the viewpoint and the viewpoint score to the corresponding segment when the pair of the viewpoint and the viewpoint score is received a plurality of times as an input within a single segment.

7. The meta data creation apparatus according to claim 1, wherein the viewpoint score input section inputs the pair of the viewpoint and the viewpoint score simultaneously.

8. The meta data creation apparatus according to claim 1, wherein the display displays a list including the input pair of the viewpoint and the viewpoint score.

9. The meta data creation apparatus according to claim 1, wherein the viewpoint score input section comprises a plurality of viewpoint input score sections configured to receive as input, the pair of the viewpoint and the viewpoint score, respectively, and wherein the meta data creator is configured to assign the input pair of the viewpoint and the viewpoint score to the corresponding segment when said plurality of viewpoint input score sections receive the pair of the viewpoint and the viewpoint score.

10. A method for creating meta data, comprising:

receiving contents, as input;

displaying the input contents;

dividing the input contents into a plurality of segments according to a content of the contents and assigning a start time and an end time for each segment as second time information with respect to first time information included in the contents;

receiving as input, a pair of a viewpoint and a viewpoint score, by operation of a key, the viewpoint comprising a keyword based on the content of the contents to be displayed, and the viewpoint score indicating a degree of importance of the viewpoint;

determining whether the pair of the viewpoint and the viewpoint score is received as input in a corresponding segment, and, when the pair of the viewpoint and the viewpoint score is received as input in the corresponding segment, creating, with reference to a viewpoint score assignment table where the pair of the viewpoint and the viewpoint is assigned to the key, meta data assigned to the input pair of the viewpoint and the viewpoint score corresponding to the operated key and the second time information, for the corresponding segment; and storing the created meta data in a meta data storage section.

* * * * *